United States Patent
Kaihotsu

(10) Patent No.: US 7,476,847 B2
(45) Date of Patent: Jan. 13, 2009

(54) ADAPTIVE IMAGE READING APPARATUS AND CONTROL METHOD OF THE APPARATUS

(75) Inventor: Takahiro Kaihotsu, Fujisawa (JP)

(73) Assignee: Canon Components, Inc., Saitama-ken (JP)

( * ) Notice: Subject to any disclaimer, the term of this patent is extended or adjusted under 35 U.S.C. 154(b) by 49 days.

(21) Appl. No.: 11/572,786

(22) PCT Filed: Jul. 25, 2005

(86) PCT No.: PCT/JP2005/013583

§ 371 (c)(1),
(2), (4) Date: Jan. 26, 2007

(87) PCT Pub. No.: WO2006/011450

PCT Pub. Date: Feb. 2, 2006

(65) Prior Publication Data

US 2008/0029687 A1   Feb. 7, 2008

(30) Foreign Application Priority Data

Jul. 29, 2004 (JP) ............................. 2004-221259
Jun. 7, 2005 (JP) ............................. 2005-167464

(51) Int. Cl.
*H01J 3/14* (2006.01)
*G01J 1/32* (2006.01)

(52) U.S. Cl. ..................................... 250/235; 250/205

(58) Field of Classification Search ................. 250/205, 250/208.1, 226, 234, 235; 358/475, 436, 358/512–520; 355/35; 399/54
See application file for complete search history.

(56) References Cited

U.S. PATENT DOCUMENTS

| | | | | |
|---|---|---|---|---|
| 4,926,253 A | * | 5/1990 | Nakashima et al. | 358/515 |
| 5,000,569 A | * | 3/1991 | Nylund | 356/237.1 |
| 5,077,605 A | * | 12/1991 | Ikeda et al. | 358/521 |
| 5,753,906 A | | 5/1998 | Gennetten | 250/226 |
| 5,898,510 A | | 4/1999 | Kaihotsu et al. | 358/509 |
| 6,459,512 B1 | * | 10/2002 | Kawahara et al. | 358/515 |
| 7,202,461 B2 | * | 4/2007 | Muraoka | 250/208.1 |
| 2002/0030837 A1 | | 3/2002 | Hokoi | 358/1.9 |
| 2007/0145233 A1 | | 6/2007 | Kaihotsu | 250/205 |

FOREIGN PATENT DOCUMENTS

| | | |
|---|---|---|
| JP | 61-148959 | 7/1986 |
| JP | 3-295353 | 12/1991 |
| JP | 8-275006 | 10/1996 |
| JP | 8-298571 | 11/1996 |
| JP | 11-243492 | 9/1999 |
| JP | 2002-171388 | 6/2002 |

OTHER PUBLICATIONS

Japanese Official Communication Regarding Japanese Patent Application 2006-529318 (Apr. 2, 2007), and its English Translation.
Translation of PCT International Preliminary Report on Patentability.

* cited by examiner

*Primary Examiner*—Que T Le
*Assistant Examiner*—Pascal M Bui-Pho
(74) *Attorney, Agent, or Firm*—Fitzpatrick, Cella, Harper & Scinto

(57) ABSTRACT

The invention alters the light emission proportion of each of five LEDs for each of a plurality of accumulation cycles in a main scanning direction, in accordance with light emission conditions that are configured in the lighting condition register, causes the emission spectra of the multicolored illumination that composites the light emitted from the five LEDs to approximate three types of color-matching functions that are represented with CIEXYZ or other standard color space, and thus, use a sensor to convert the light that is illuminated by the five LEDs onto an original, and reflected therefrom, into an electrical signal.

8 Claims, 19 Drawing Sheets

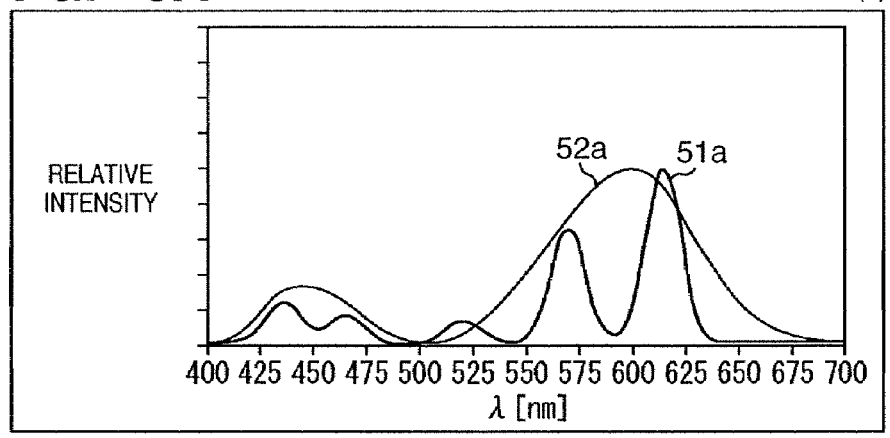
FIG. 5A  APPROXIMATION OF CIE ISOCHROMATIC FUNCTION X(λ)
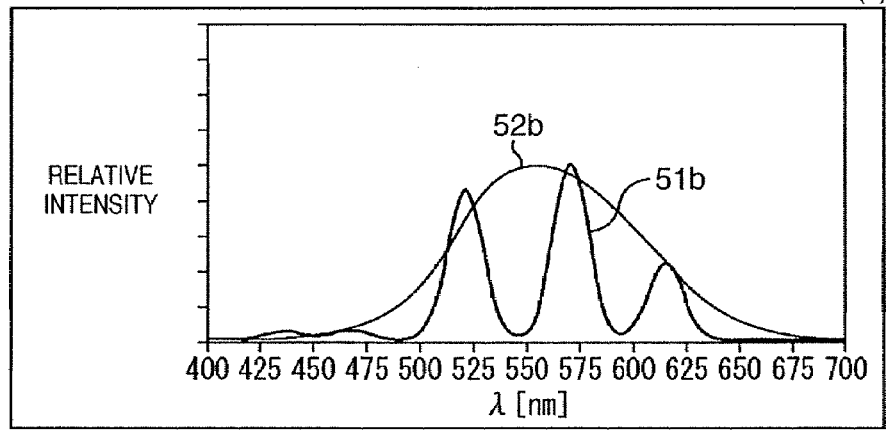
FIG. 5B  APPROXIMATION OF CIE ISOCHROMATIC FUNCTION Y(λ)
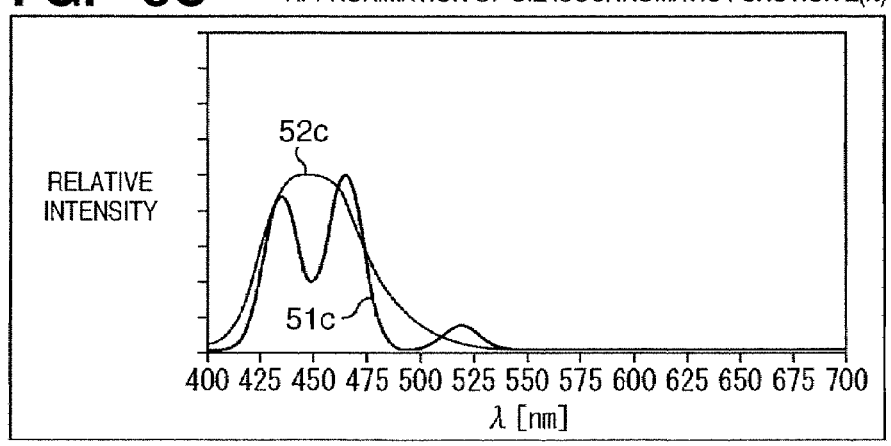
FIG. 5C  APPROXIMATION OF CIE ISOCHROMATIC FUNCTION Z(λ)

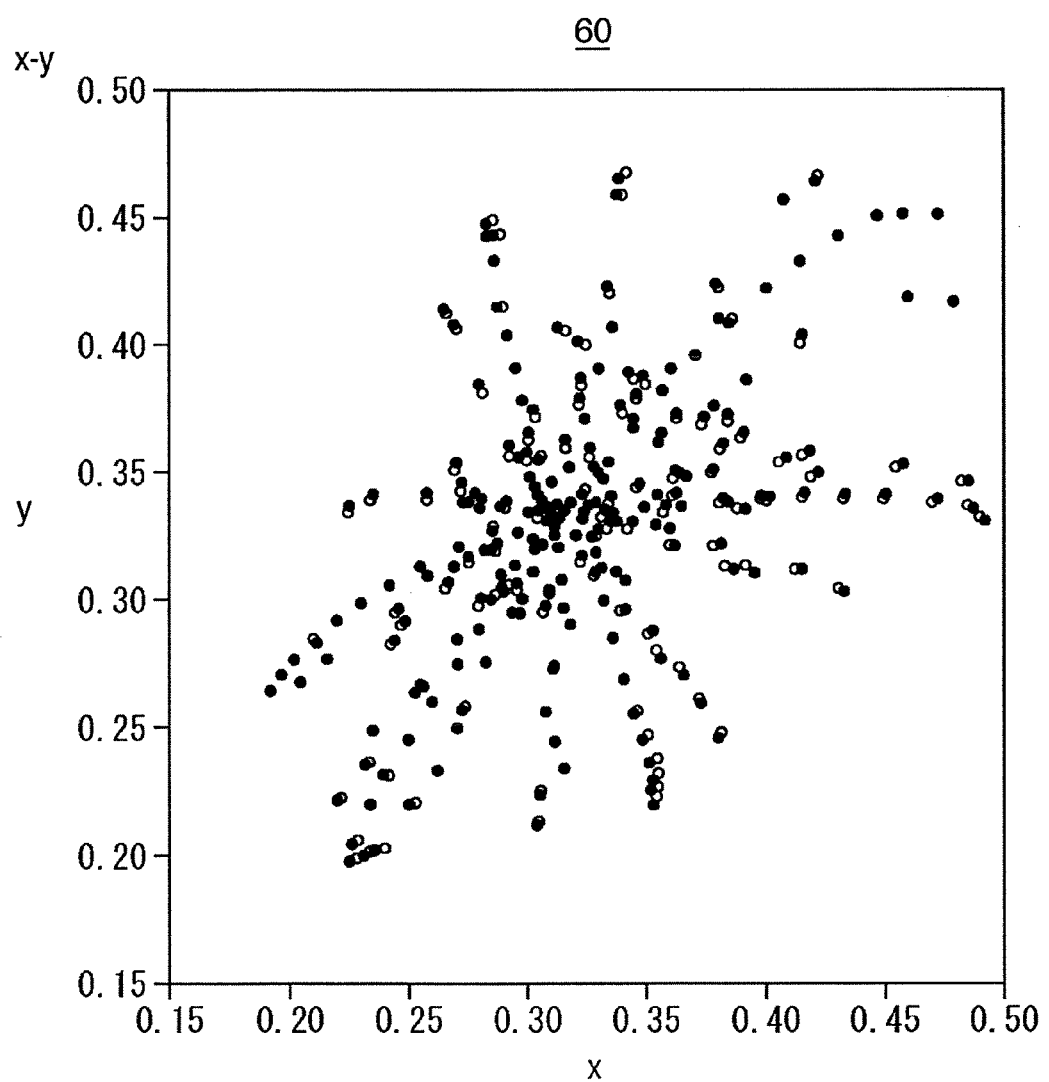

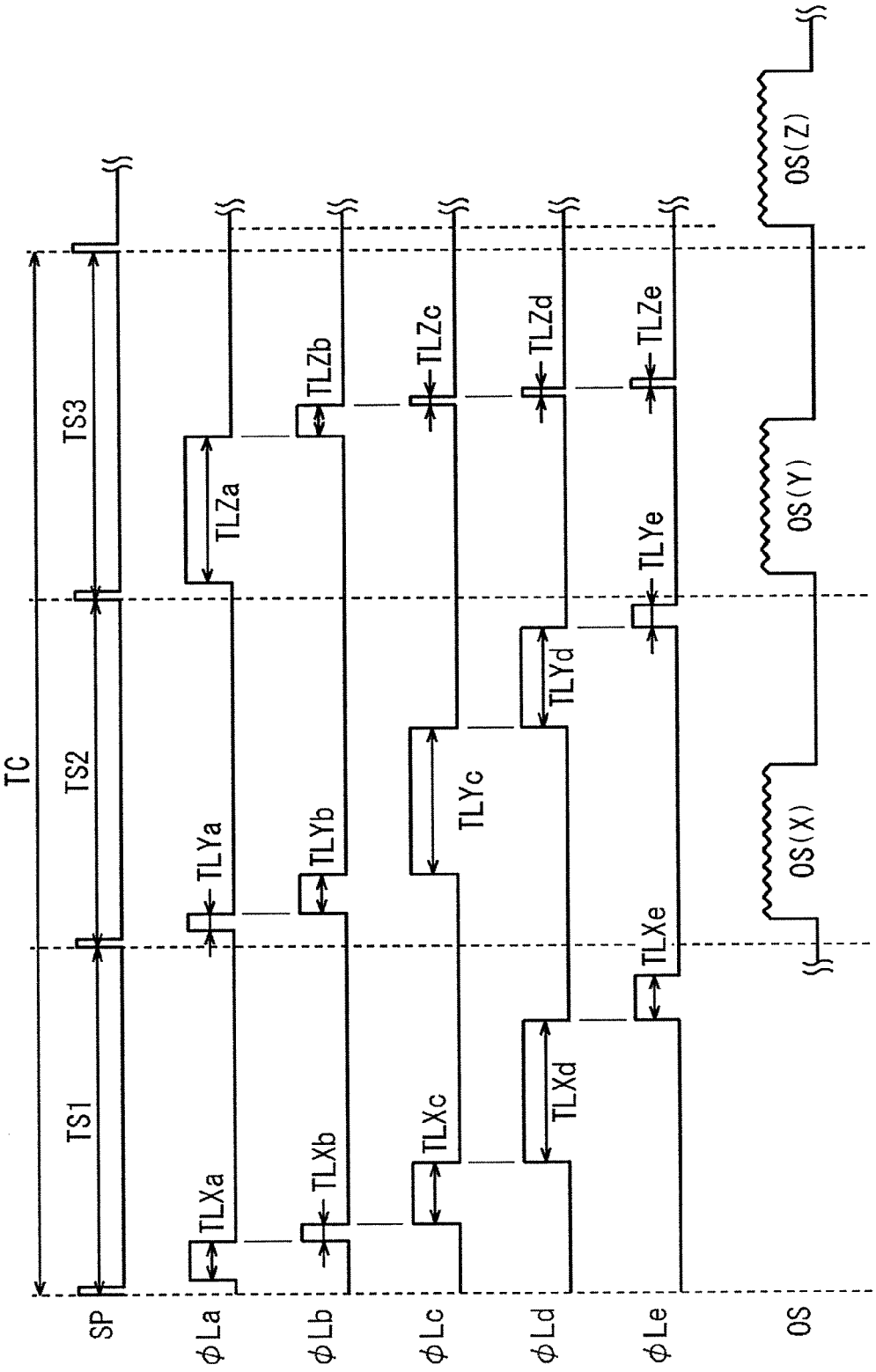

US 7,476,847 B2

ADAPTIVE IMAGE READING APPARATUS AND CONTROL METHOD OF THE APPARATUS

TECHNICAL FIELD

The present invention relates to an image reading apparatus and an image reading method, and is particularly optimized for use in reading image information.

BACKGROUND ART

An image scanner or other image reading apparatus typically has a composition along the lines of that shown in FIG. 19. In FIG. 19, an image sensor unit 1 converts optical information from an original 7, placed on a original glass plate 4, into an electrical signal. A movement unit 2 alters the relative positions of the original 7 and the image sensor unit 1, and alters the reading position of the original 7. A control unit 3 drives the image sensor unit 1 and the movement unit 2, and processes the electrical signal from the image sensor unit 1.

When inputting a color image, the image scanner or other image reading apparatus performs a color separation of the color image. Conventionally, the typical manner of performing the color separation has been to apply a color filter with differing spectral transmittance for each of red, green, and blue, or RGB, as a light sensing element, which receives light reflected from the original, illuminated by a fluorescent lamp or other white light source. In recent years, however, an image reading system with a light source switching method has become common, wherein color separation is performed by the light source by using three light emitting diodes(LEDs) with differing RGB emission spectrum as a light source, and driving the respective RGB LEDs in time sequence.

FIG. 8 shows a cross-sectional figure of a contact image sensor (CIS), which is the image sensor unit 1 in the prior art of the light source interchange scheme.

In FIG. 8, light being radiated from a light source 41, which is positioned on an end of a light guide 12, is entered within the light guide 12 and guided in a moderately long direction, and substantially homogeneously irradiates the reading position of the original 7, in a line shape along the main scanning direction of the original 7 that is placed on the original glass plate 4. A reflected light from the original irradiated in the above described manner is concentrated by a lens array 14 and transferred to a sensor array 15 provided on a sensor substrate 16 to be converted into an electrical signal. The electrical signal corresponding to the original is output via a connector 17. In FIG. 8, reference numeral 13 denotes a frame for fixing component members such as the light guide 12, the lens array 14 and the sensor substrate 16 and the like to respective predetermined positions.

The light source 41 comprises three LEDs of light each having different emitting wavelengths from each other: 41r, 41g, and 41b, which radiate red, green, and blue light, respectively. As shown in FIG. 9, the LEDs are wired using a common wire and an individual wire for each LED, and the LEDs 41r, 41g, and 41b are constituted such that they can individually control the lighting.

The image sensor unit 1 and the movement unit 2, which alters the relative positions of the original 7 and the image sensor unit 1, are driven according to prescribed timing by the control unit 3, which converts the optical information from the original 7 into an electrical signal. The operation of the control unit 3 is described in the following section.

FIG. 10 is a block diagram depicting conventional technology, and a composition of an image reading apparatus.

During an image reading operation, the control unit 3 drives the image sensor unit 1, using a light source controller 33 and a sensor controller 34, in accordance with a timing chart depicted in FIG. 11. A sensor array 15, shown in FIG. 8, which constitutes the image sensor unit 1, treats one cycle of the synchronizing signal SP, inputted from an external device, as an image information accumulation cycle TS, in which it integrates image information during one operating cycle, outputs the integrated image information in the next operating cycle.

A cycle TC, comprising three image information accumulation cycle TS of the sensor array 15, is treated as one cycle of color reading operation, and the light source 41 LEDs 41r, 41g, and 41b are turned on, individually and in sequence, by control signals $\phi$Lr, $\phi$Lg, and $\phi$Lb, using the light source controller 33 as depicted in FIG. 12, in every operating cycle during the cycle TC. Consequently, the light source switching method is performed, wherein the colors of the original 7 are separated by using the LEDs 41r, 41g, and 41b emission spectrum and the image information output or line output, OS(r), OS(g), and OS(b), which has been color separated in line sequence, may thus be obtained.

The control unit 3 drives the image sensor unit 1, a movement unit controller 32 drives the movement unit 2 synchronously therewith, changing the relative positions of the portion of the original 7 that is to be read and the image sensor unit 1, and collecting two-dimensional image information for the original 7. Following is a description of conventional image signal processing as performed by the control unit 3.

The control unit 3 performs a preparation operation such as the following, prior to a reading operation of the original 7.

Controlling the movement unit 2, the control unit 3 moves the image sensor unit 1 to a prescribed initial position. In FIG. 19, a white reference plate 5 is positioned upon the original glass plate 4 as pertains to the initial position, and the control unit 3 adjusts the individual light intensity emitted by the respective LEDs 41r, 41g, and 41b that constitute the light source of the image sensor unit 1.

The reason for adjusting the individual light intensity emitted from the respective LEDs 41r, 41g, and 41b is to correct for a fluctuation in the luminous efficiency and sensor sensitivity on the part of the respective LEDs 41r, 41g, and 41b, to meet an output level of an RGB line output OS(r), OS(g), and OS(b) into conformity with an input range VH of an A/D converter 35, and obtain image information with an optimal S/N.

An example of a technique that adjusts the light intensity emitted from the respective LEDs 41r, 41g, and 41b would be a method so used that adjusts either light intensity or light cycle of the respective LEDs 41r, 41g, and 41b, as pertains to the image information accumulation cycle TS. With regard to the light source controller 33 depicted in FIG. 12, a lighting condition register 33a is configured for setting a prescribed light cycle TD, and the white reference plate 5, which is positioned upon the original glass plate 4, is read. The maximum values of the line output for the respective colors, as pertains to the sensor array 15, are assigned to Vr1, Vg1, and Vb1, respectively, and values Tlr, Tlg, and Tlb for the respective LEDs 41r, 41g, and 41b that are set in the lighting condition register 33a, as the VH maximum values of the target output, are configured as per the following respective equations 1 through 3:

$$TLr = TD \times VH/Vr1 \qquad \text{equation (1)}$$

$$TLg = TD \times VH/Vg1 \qquad \text{equation (2)}$$

$$TLb = TD \times VH/Vb \qquad \text{equation (3)}$$

As a result, the light intensities emitted by the LEDs 41$r$, 41$g$, and 41$b$ are respectively adjusted by light cycles, and output levels of the RGB line outputs OS($r$), OS($g$), and OS($b$) are equivalent thereto, conforming with the input range VH of the A/D converter 35.

Reference data is obtained and stored in a memory 37 that is used by a shading corrector 36 that compensates for an offset error or a gain error contained in an output signal from the sensor array 15. Described specifically, the light source 41 is put into a lights out state, and offset correction data D is obtained and stored in the memory 37. The light cycles of the three LEDs 41$r$, 41$g$, and 41$b$ that constitute the light source 41 are respectively set to the light cycles Tl$r$, Tl$g$, and Tl$b$, corresponding to their corrected light intensities as described above. The three LEDs 41$r$, 41$g$, and 41$b$, with light cycles Tl$r$, Tl$g$, and Tl$b$, are respectively turned on in sequence, and gain correction data W$r$, W$g$, and W$b$ are obtained and stored in the memory 37.

After performing the preparation operation, the control unit 3 drives the image sensor unit 1 and the movement unit 2, respectively, and converts optical information of the original 7 into an electrical signal. An analog signal that is outputted by the image sensor unit 1 is converted to digital data by the A/D converter 35.

The shading corrector 36 performs, for example, computations in the following equations 4 through 6 for the respective color line output S$r$, S$g$, and S$b$ of the sensor array 15, thus correction for the offset error or the gain error, and obtaining a normalized line output [R], [G], and [B]:

$$[R]=(Sr-D)/(Wr-D) \quad \text{equation (4)}$$

$$[G]=(Sg-D)/(Wg-D) \quad \text{equation (5)}$$

$$[B]=(Sb-D)/(Wb-D) \quad \text{equation (6)}$$

The normalized line output [R], [G], and [B], having had shading correction for, is temporarily stored in a line memory 38. Time delay of image signal that is color separated in line sequence is adjusted. RGB normalized output signals R$i$, G$i$, and B$i$, that correspond to a given position on the original 7, are extracted in sequence, and color space conversion processing on the RGB normalized output signals is performed by a color space converter 39. FIG. 13 depicts a view explaining a color space conversion using the color space converter 39. In FIG. 13, a 3×3 correction matrix M is used to perform the color space conversion processing. RGB normalized output signals X$i$, Y$i$, and Z$i$ are thus outputted, having had the color space conversion processing performed thereon.

Image data that has been subjected to colorimetry by an image input device (input device) is reproduced by an image output device (output device), such as a display, a printer and the like. The image input device or the image output device, however, possesses its own unique color space due to a light source, a filter, or a pigment and the like. Hence, in order to obtain a desired color reproduction while connecting the image input device to the image output device, it is necessary a signal processing taking the difference between their color spaces into account. Although a single color space converter for converting the color space of the image input device into the color space of the image output device will be sufficient if the respective color spaces have a fixed one-to-one correspondence, the inputted image data will have a variety of applications, and thus, the output device cannot be specified, as a rule.

As a consequence, the image input device converts image data having a unique color space of an image input device into common standard device-independent color space, and outputs the converted result. Upon reproducing the image data by an image output device, it is constructed such that the image data having the standard color space is converted to the color space of the image output device. Color spaces as CIEXYZ or CIELAB are used as the standard color space.

Coefficients of the 3×3 correction matrix M that is contained within the color space converter 39 are calculated, for example, by a sensor signal vis-à-vis N color charts for which tri-stimulus values are established. More concretely, assigning the tri-stimulus value matrix of the target N colors to TN, and the sensor output matrix vis-à-vis the target N colors to UN, allows deriving the correction matrix M by the following equation 7, as the mean square error of TN and T'N, i.e., MU, goes to its minimum:

$$M=[TNUNt][UNUNt]-1 \quad \text{equation (7)}$$

The ISO/DIS 12641 IT8 color chart is recognized as a standard color chart that is used in such color proofing.

Patent Related Literature 1: Japanese Patent Laid-Open No. 61-148959 (KOUKAI SHOWA 61-148959);

Patent Related Literature 21: Japanese Patent Laid-Open No. 08-275006 (KOUKAI HEI 08-275006);

Patent Related Literature 3: Japanese Patent Laid-Open No. 11-243492 (KOUKAI HEI 11-243492)

DISCLOSURE OF INVENTION

Problems to be Solved

The foregoing related art, however, has the following problem:

In order to shrink calorimetric error in an image reading apparatus, it is necessary for the image sensor unit 1 being used to satisfy a condition known to be a Luther condition. That is, it is necessary that a total spectral sensitivity of a sensor vis-à-vis an color-matching function that constitutes the standard color space be a linear combination.

On the other hand, a conventional sensor array uses the LEDs 41$r$, 41$g$, and 41$b$ as the light source 41, and color separation is performed by switching the LEDs 41$r$, 41$g$, and 41$b$. Hence, the total spectral sensitivity is nearly established by the emission spectra of the LEDs 41$r$, 41$g$, and 41$b$.

FIG. 14 depicts a view illustrating CIEXYZ color-matching function $x(\lambda)$, $y(\lambda)$, and $z(\lambda)$ normalized at peaks, and the emission spectra $r(\lambda)$, $g(\lambda)$, and $b(\lambda)$, of the three RGB LEDs 41$r$, 41$g$, and 41$b$, that is used in the conventional CIS. The typical value of the dominant wavelength and the half bandwidth of the emission spectra $r(\lambda)$, $g(\lambda)$, and $b(\lambda)$, of the three RGB LEDs 41$r$, 41$g$, and 41$b$, that are used in the sensor array are as follows:

R: Dominant Wavelength $\lambda d=630$ nm, Half bandwidth=Approx. 20 nm;

G: Dominant Wavelength $\lambda d=535$ nm, Half bandwidth=Approx. 35 nm; and

B: Dominant Wavelength $\lambda d=470$ nm, Half bandwidth=Approx. 30 nm.

As is apparent from FIG. 14, the half bandwidths of the emission spectra $r(\lambda)$, $g(\lambda)$, and $b(\lambda)$, of the LEDs 41$r$, 41$g$, and 41$b$ are respectively narrower than the spectra widths of the corresponding color-matching function $x(\lambda)$, $y(\lambda)$, and $z(\lambda)$. Accordingly, it is difficult to approximate the color-matching function $x(\lambda)$, $y(\lambda)$, and $z(\lambda)$ that constitutes the standard color space simply by combining the emission spectra $r(\lambda)$, $g(\lambda)$, and $b(\lambda)$, of the LEDs 41$r$, 41$g$, and 41$b$, resulting in poor colorimetric performance.

FIG. 15 depicts an x-y chromaticity diagram expressing calorimetric errors obtained by simulating a conventional image reading apparatus that uses the LEDs 41r, 41g, and 41b. In the x-y chromaticity diagram shown in FIG. 15, white dots denote the XYZ tristimulus values of IT8 target, and the black dots denote the tristimulus values that are the output of the image sensor unit 1 in the conventional image reading apparatus that uses the LEDs 41r, 41g, and 41b. As shown in FIG. 15, the positions of the white dots and the black dots vary, allowing verification that calorimetric errors are occurring.

ΔE, an average color difference obtained from the x-y chromaticity diagram depicted in FIG. 15, is approximately eight. It is understood that it is possible to distinguish the calorimetric error with the naked eye typically, in a case where the standard color difference ΔE is more than three. Accordingly, it is suggested that ΔE, the average color difference obtained from the x-y chromaticity diagram depicted in FIG. 15, is a value that large enough to be adequately identified by a human being.

A method for dealing with the issue has been considered that aims to the prescribed color reproduction by changing the lighting conditions of a light source, as per Patent Related Literature 1. An attempt has also been made to shrink the calorimetric error while using the LED with narrow half bandwidth of emission spectra as the light source, by increasing the number of colors of the light source, or in other words, the number of color separations, as per Patent Related Literatures 2 and 3. Patent Related Literature 2 discloses a method for increasing reproducibility of color information by using a four-color LEDs, which are formed by adding a blue-green LED to the conventional three RGB LEDs, converting image information into the tristimulus values.

The idea allows improving colorimetry performance even while using the LEDs with narrow half bandwidth of emission spectrum as the light source. Increasing the number of color separation by the light source switching method, however, requires performing a number of scans in accordance with the number of colors. Consequently, it turns to an issue that reading time of the original 7 will increase. An additional issue is increased system resources such as a memory device, to store the image information once read.

A description of the issue herewith follows, using an image sensor apparatus that uses a five-color LEDs to separate color into five colors as an example. LEDs, as a light source, having five different emission wavelengths from each other are wired via a wiring assembly similar to that depicted in FIG. 9, thus enabling the lighting of the five LEDs each to be controlled independently of the others. By supplying control signals φLa, φLb, φLc, φLd, and φLe that are generated by a pulse generation unit 160b, in accordance with a lighting cycle Tla through Tle that are set in a lighting condition register 160a that is built into a light source controller 160, such as depicted in FIG. 16, allows the five LEDs that are assembled as a light source 161 each to be turned on individually.

When driving the image sensor apparatus as the foregoing according to a conventional method, the five LEDs are controlled, for example, by the control signals φLa, φLb, φLc, φLd, and φLe that are generated by a timing chart as depicted in FIG. 17. That is, it is easy to imagine obtaining an image signal with the respective timing of the sequential emission of the five LEDs in time sequence via a conventional typical color separation method, such as depicted in FIG. 17.

As depicted in FIG. 18, a color space conversion unit 180 uses a 3×5 correction matrix M to obtain an image signal of tristimulus values Xi, Yi, and Zi in a standard color space from five types of color information Ai, Bi, Ci, Di, and Ei.

As being apparent from the foregoing, performing an operation of switching between a five-color light source with conventional technology requires 5/3, or approx. 1.67 times, as much time as an operation of switching between a three-color light source. Furthermore, the amount of memory used, as a system resource of the image reading apparatus depicted in FIG. 10, for shading correction, line retardation, or color conversion, is also 5/3, or approx. 1.67 times, that used when using a three-color light source.

The present invention was conceived with the foregoing issue in mind, and is characterized by resolving the foregoing conventional defect, as an example.

The objective of the present invention is to shrink calorimetric error as much as possible, while restraining increases in read time and increases in memory consumption when reading an original.

Means to Solve the Problem

An image reading apparatus according to an aspect of the present invention comprises an assembly such as follows:

An image reading apparatus, comprising:

not less than four light emission elements, each with an emission spectrum different from the others;

an emission control unit adapted to controlling, at least one of emission cycle and emission intensity of the not less than four light emission elements, and causing the light emission elements, either whole or in part, to emit light, either for an identical or a differing cycle, within an accumulation cycle;

a photoelectric conversion unit adapted to receiving light reflected from an original, which is obtained by emitting light from the not less than four light emission elements toward the original, according to the control of the emission control unit, and converting the reflected light into an electrical signal; and a reading unit adapted to reading image information from the original, in accordance with the electrical signal that is converted by the photoelectric conversion unit, wherein the photoelectric conversion unit receives light reflected from the original for each of a plurality of accumulation cycles in the main scanning direction; and the emission control unit causes the not less than four light emission elements, either whole or in part, to emit light, for each of the plurality of accumulation cycles in the main scanning direction, and causes a relative light emission quantity proportion of light emitted in at least one accumulation cycle to be approximated to one curve of three types of color-matching functions, wherein the number of accumulation cycles in the main scanning direction is not less than three, and less than the number of light emission elements.

Effects of the Invention

The present invention has the effect of shrinking calorimetric error while restraining increases in read time and increases in memory consumption, when reading an original.

Further characteristics, objectives, and advantages of the present invention will become clear from the following drawings and descriptions. Components that are common across multiple drawings are designated with identical symbols.

BRIEF DESCRIPTION OF DRAWINGS

Drawings that constitute a portion of an embodiment of the application will both describe the embodiment and exemplify the present invention, by way of describing the principle of the present invention.

FIG. 5A, FIG. 5B, and FIG. 5C each depicts an example of a property of illumination that may be obtained via an image reading apparatus according to the first embodiment of the present invention;

FIG. 6 depicts an x-y chromaticity diagram that displays calorimetric precision obtained by simulating an image reading apparatus according to the first embodiment of the present invention;

FIG. 7 is a timing chart that describes an image sensor unit driving operation when partitioning light source lighting time with an image reading apparatus according to a second embodiment of the present invention;

BEST MODE FOR CARRYING OUT THE INVENTION

A detailed description of preferred embodiments of the present invention will be made herein, with reference to the attached drawings. The embodiments do not limit the invention with regard to the claims, nor are all combinations of characteristics described in the embodiments necessary to the solutions propounded within the invention.

First Embodiment

Figure 1:
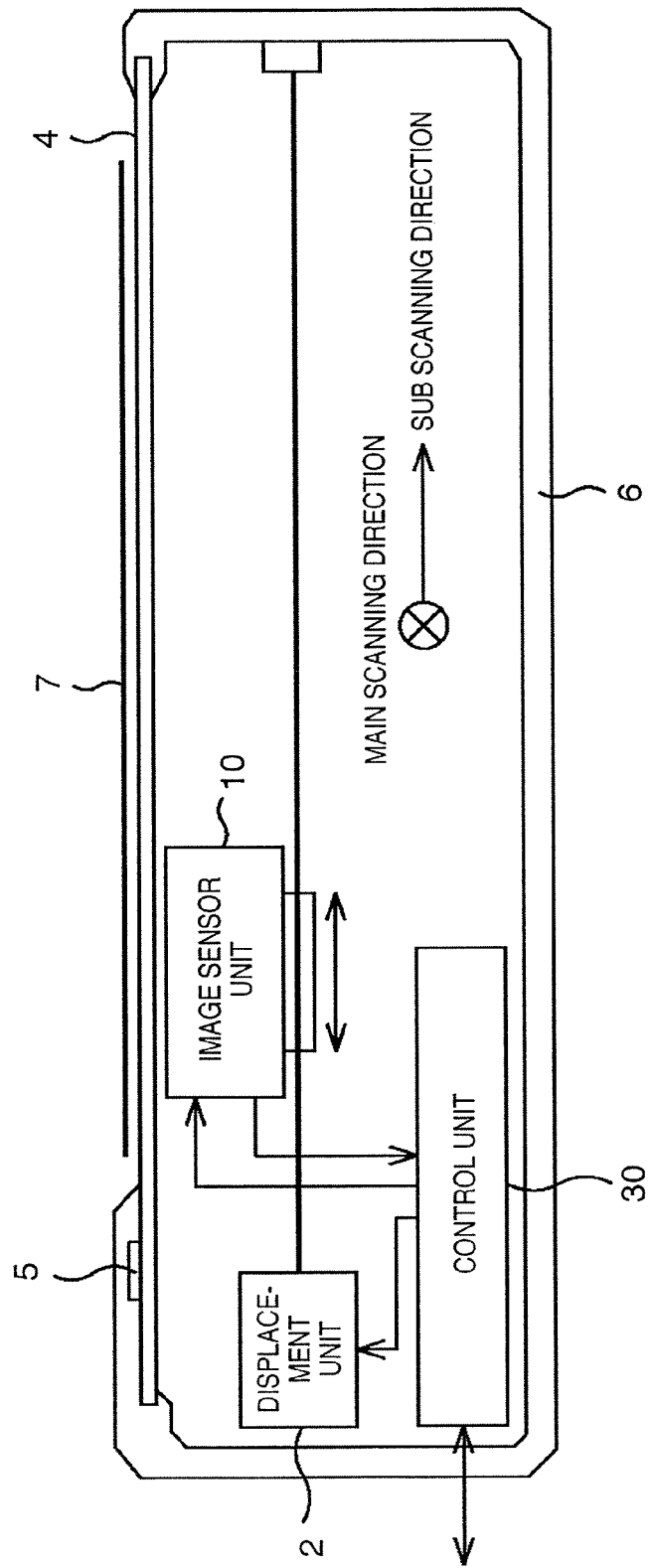
FIG. 1 depicts an exploded cross-sectional view that describes a sample assembly of an image reading apparatus according to a first embodiment of the present invention.

FIG. 1 depicts an exploded cross-sectional view that describes a sample assembly of an image reading apparatus according to an embodiment of the present invention. An image reading apparatus 6 according to the embodiment has a different image sensor unit and control unit assembly from that of the conventional image reading apparatus shown in FIG. 19. Accordingly, components of the image reading apparatus 6 that are identical to the conventional image reading apparatus will be marked with symbols identical to the symbols shown in FIGS. 8 through 19, and detailed descriptions thereof will be omitted.

(Image Reading Apparatus Assembly)

The image reading apparatus 6 according to the embodiment is capable of being used for scanning, color facsimile, or as a multi-function peripheral thereof, as well as an image input component of a color copier. The description according to the embodiment will cite an example of an image reading apparatus comprising an image sensor unit 10, with five LEDs 11a, 11b, 11c, 11d, and 11e, per FIG. 4, each with an emission wavelength that differs from the others, as a light source.

The five LEDs 11a through 11e comprise respective driving terminals for each individual emission element, and are constituted so as to allow the five LEDs each to light independently of the other LEDs. Whereas the embodiment describes an instance of using five LEDs, it is desirable for there to be LEDs of more colors than colors that constitute the light source, as described hereinafter. The image sensor unit 10 is a contact image sensor (CIS), with an assembly similar to that depicted in FIG. 8, according to the embodiment.

A brief description of the image reading apparatus 6 according to the embodiment will be made hereinafter, with reference to a flatbed image reading apparatus as an example. The primary component of the image reading apparatus 6 is the image sensor unit 10, wherein is installed the movement unit 2, which alters the lighting and reading position of the original 7. The original 7 is fixed in place upon the original glass plate 4, and the image sensor unit 10 moves in a sub scanning direction.

The movement unit 2 sequentially alters the relative position of the image sensor unit 10 to an original. Accordingly, image information that the sensor array 15 detects varies according to the position of the image sensor unit 10. The image reading apparatus 6 according to the embodiment comprises the line memory 38, in FIG. 2, for positional correction in order to reproduce image information for a given position of the original 7, when performing a scan for three-color RGB.

A typical photoelectric conversion unit of the sensor array 15 of the image sensor unit 10 would be a CMOS light receiving device and a CCD light receiving device. According to the embodiment, the image sensor unit 10 comprises a plurality of multi-color LEDs that are used as a light source, which use three types of light to irradiate the original 7, and receive the light reflected therefrom with the light receiving devices of the sensor array 15. The light receiving device thus does nothing more than photo-electrically conversion of a single color of image information, even for image information accumulation cycle TS. Hence, the image reading apparatus 6 according to the embodiment is able to use either the CMOS light receiving device or the CCD light receiving device as the light receiving device.

Figure 2:
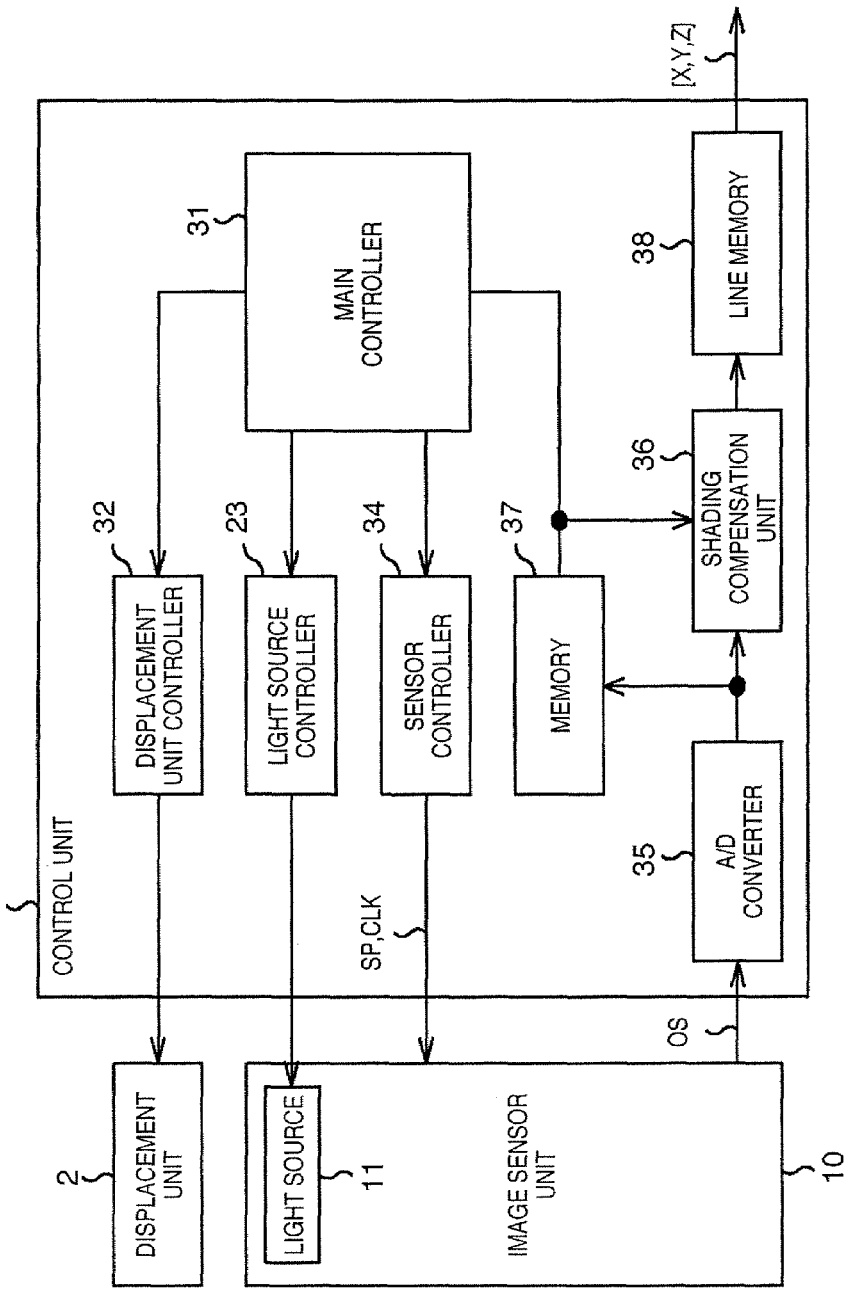
FIG. 2. is a block diagram that describes a functional assembly of an image reading apparatus according to the first embodiment of the present invention.

FIG. 2. is a block diagram explaining a functional assembly of the image reading apparatus 6 according to the embodiment. The image sensor unit 10 scans the entirety of the original 7, while changing the reading position by the image sensor unit 10 using the movement unit 2 in accordance with control of the movement unit controller 32, which is provided in a control unit 30. During the scan cycle, lighting conditions of a light source 11, or in other words, a light source drive signal, or drive signal, corresponding to the emission intensity or emission cycle of the LEDs 11a through 11e, are provided to the light source 11 within the image sensor unit 10, with a light source controller 23.

Figure 3:
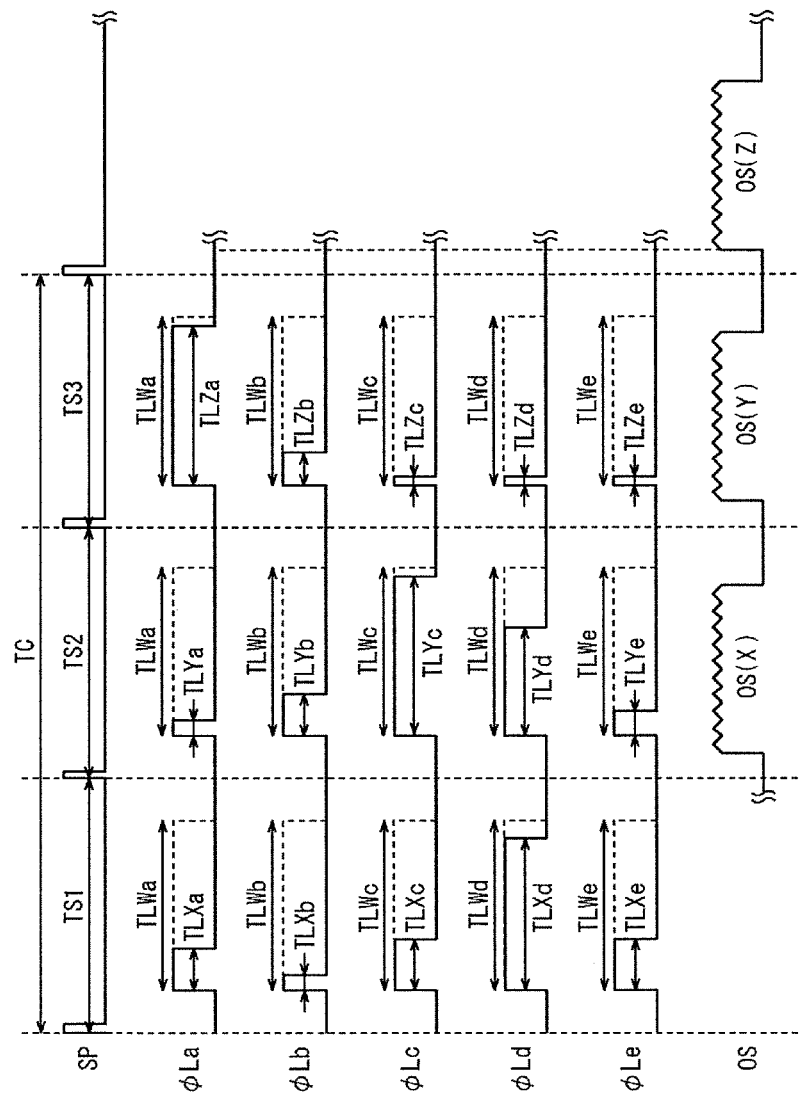
FIG. 3. is a timing chart explaining an example of driving operation of the image sensor unit 10 while in operation of reading an original 7 with regard to an image reading apparatus according to the first embodiment.

FIG. 3. is a timing chart explaining an example of driving operation of the image sensor unit 10 while in operation of reading an original 7 with regard to an image reading apparatus according to the first embodiment.

TC in FIG. 3 depicts an accumulation cycle of an image signal in a single scan line. Within the accumulation cycle TC, the sensor array 15 that constitutes the image sensor unit 10 integrates, or accumulates, an image signal for a three cycle image signal integration cycle, or accumulation cycle, TS1, TS2, and TS3. That is to say, reading is performed three times in the main scanning direction according to the first embodiment.

Figure 4:
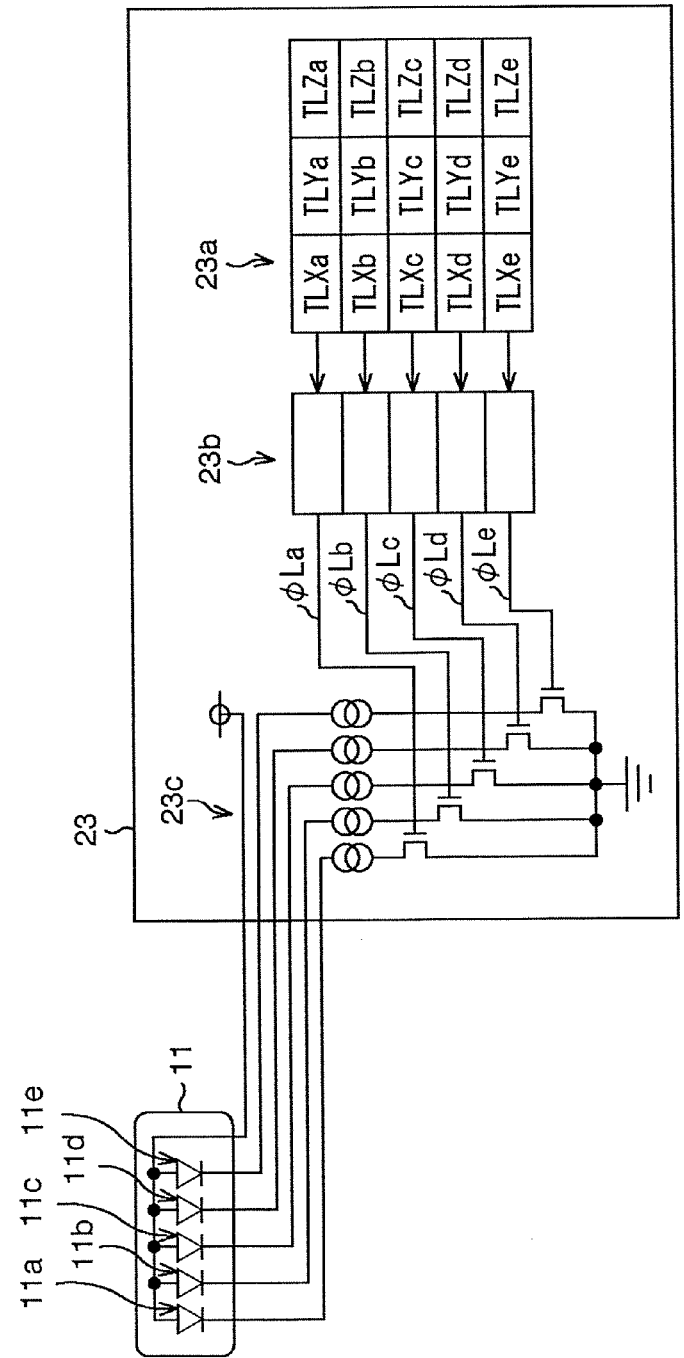
FIG. 4. is a block diagram depicting a sample assembly of a light source controller of an image reading apparatus according to the first embodiment of the present invention.
Figure 8:
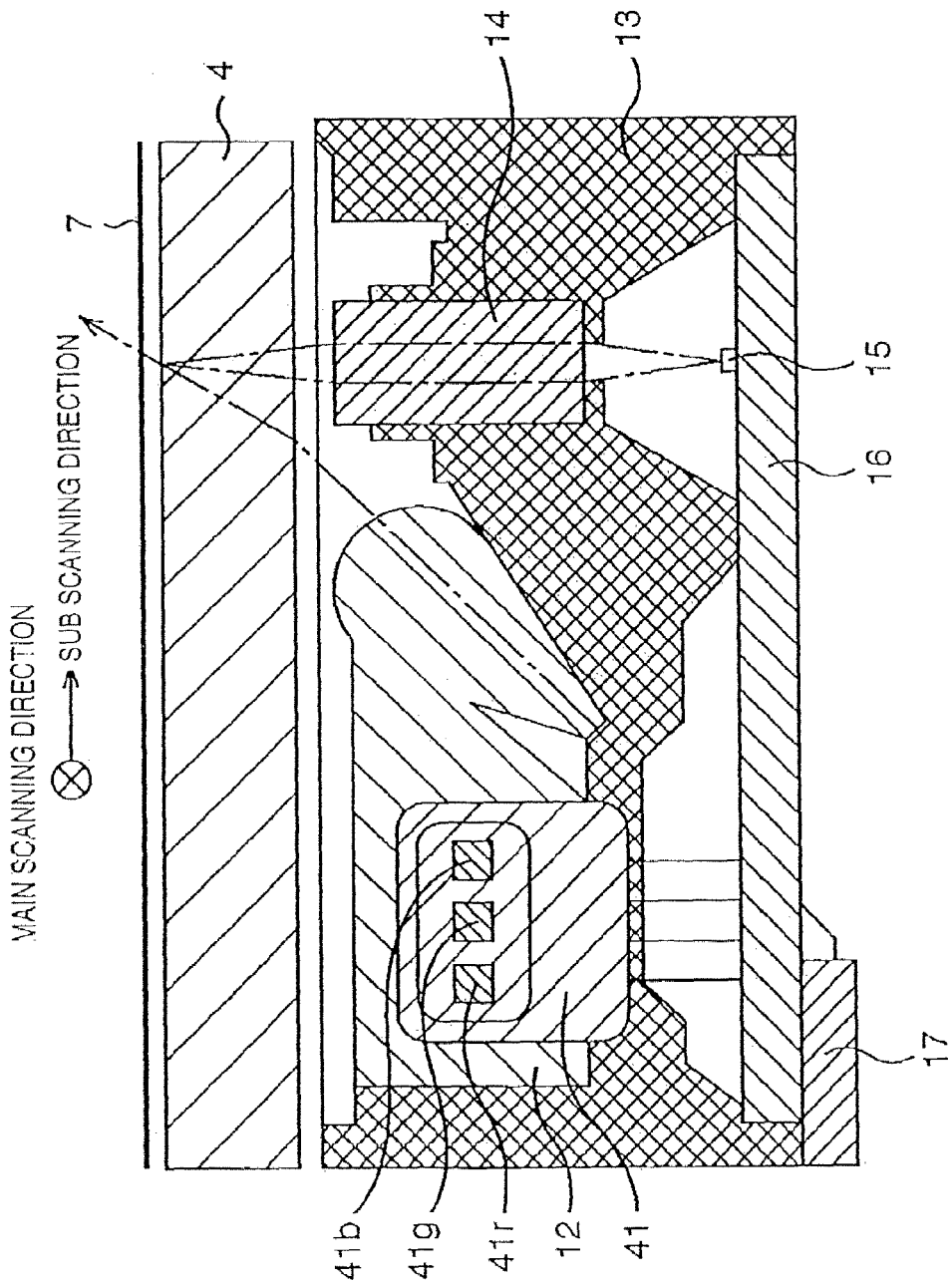
FIG. 8 is a cross-sectional diagram illustrating a conventional image sensor unit assembly.
Figure 9:
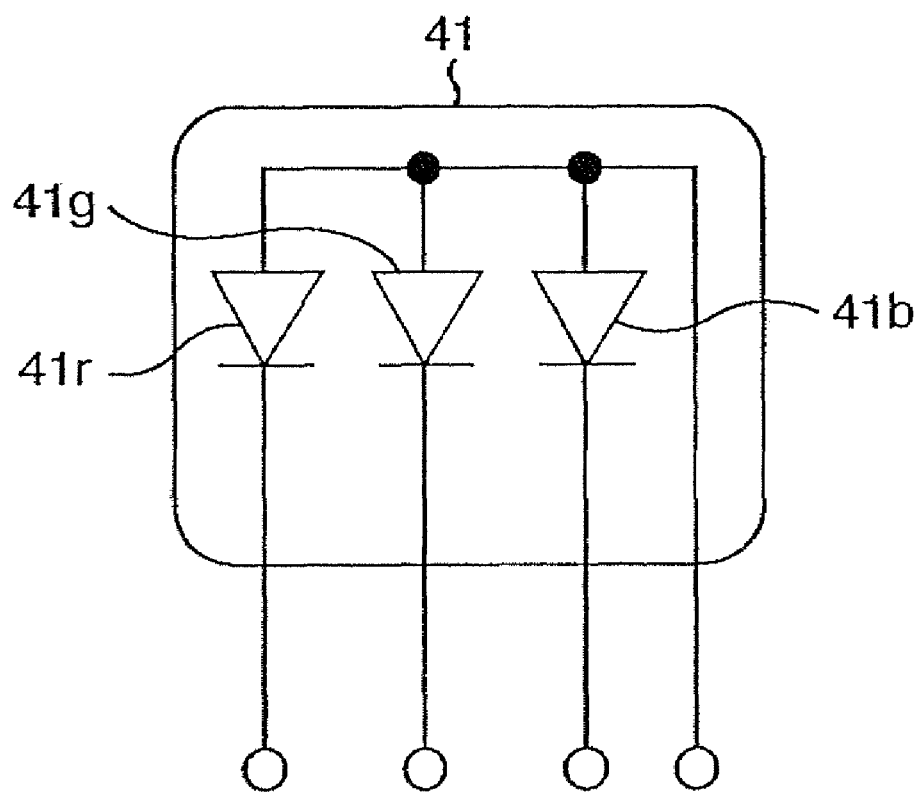
FIG. 9 depicts a view of LEDs positioning with regard to the conventional image sensor unit assembly.

Driving signals φLa, φLb, φLc, φLd, and φLe are respectively outputted at respective timing depicted in FIG. 3, for the LEDs 11a through 11e, from the light source controller 23, within the respective accumulation cycles TS1, TS2, and TS3, as depicted in FIG. 3. That is to say, the drive signals φLa through φLe are generated by a pulse generation unit 23b in FIG. 4, in accordance with values set in a lighting condition register 23a which is provided in the light source controller 23. The drive signals φLa through φLe are respectively supplied to switching circuits of a lighting circuit 23c that respectively correspond to respective LEDs, and drive the lighting of the LEDs 11a through 11e that constitute the light source 11. The respective lighting conditions of the five LEDs 11a through lie on a per cycle basis are stored in the lighting condition register 23a, as depicted in FIG. 4. Accordingly, it is possible to drive the respective LEDs 11a through 11e in three types of lighting patterns which have varied proportions of light intensity and light cycles, by controlling the lighting of each LED in accordance with the lighting conditions. That is to say, it is possible to vary the respective light pattern of the LEDs 11a through 11e for each of the respective accumulation cycles TS1, TS2, and TS3.

(Color-matching Function Approximation Method)

In the present embodiment, the three types of light pattern that change the emission proportion of each of the LEDs 11a through 11e are determined such that the emission spectra of the multi-color emitted light approximates each of the three types of color-matching functions that are represented with CIEXYZ or other standard color spaces. That is to say, the three types of light pattern that change the emission proportion of each of the LEDs 11a through 11e are determined such that the proportion of the relative light intensity that is emitted by the LEDs 11a through 11e has an intensity ratio that is approximated to the three types of color-matching functions that are represented with CIEXYZ or other standard color spaces.

The technique is as follows: the intensity of emitted light of each of the LEDs 11a through 11e is standardized with the spectral sensitivity of the sensor 15. With regard to the image reading apparatus 6 according to the first embodiment, the control unit 30 drives the movement unit 2, moving the image sensor unit 10 to the position of the white reference plate 5 that is placed on the original glass plate 4. It is desirable that the color of the white reference plate 5 be a neutral color with a flat spectral reflection ratio.

Each of the five LEDs 11a through 11e is independently turned on to irradiate the white reference plate 5, and lighting time TLWn required for the output of the sensor 15 to reach a prescribed value is measured. The five LEDs 11a through 11e are used as the light source, and the measured lighting time TLWn of the five LEDs 11a through 11e are presumed to be TLWa, TLWb, TLWc, TLWc, TLWd, and TLWe, respectively.

The light source controller 23, depicted in FIG. 4, configures the lighting condition register 23a to the prescribed light cycle TD, and turns on the respective LEDs. The light from each LED is reflected from the white reference plate 5, and the reflected light is detected. The maximum values of the line output of the respective colors of the image sensor unit 10 in the present circumstance is presumed to be Va1, Vb1, Vc1, Vd1, and Ve1, the maximum value of the line output that is to be a target is presumed to be VH. The light cycle TLWa through TLWe for the white reference plate 5, according to the respective color LEDs 11a through 11e, may be derived by the following equations 8 through 12:

$$TLWa = TD \times VH/Va1 \qquad \text{equation (8)}$$

$$TLWb = TD \times VH/Vb1 \qquad \text{equation (9)}$$

$$TLWc = TD \times VH/Vc1 \qquad \text{equation (10)}$$

$$TLWd = TD \times VH/Vd1 \qquad \text{equation (11)}$$

$$TLWe = TD \times VH/Ve1 \qquad \text{equation (12)}$$

Figure 18:
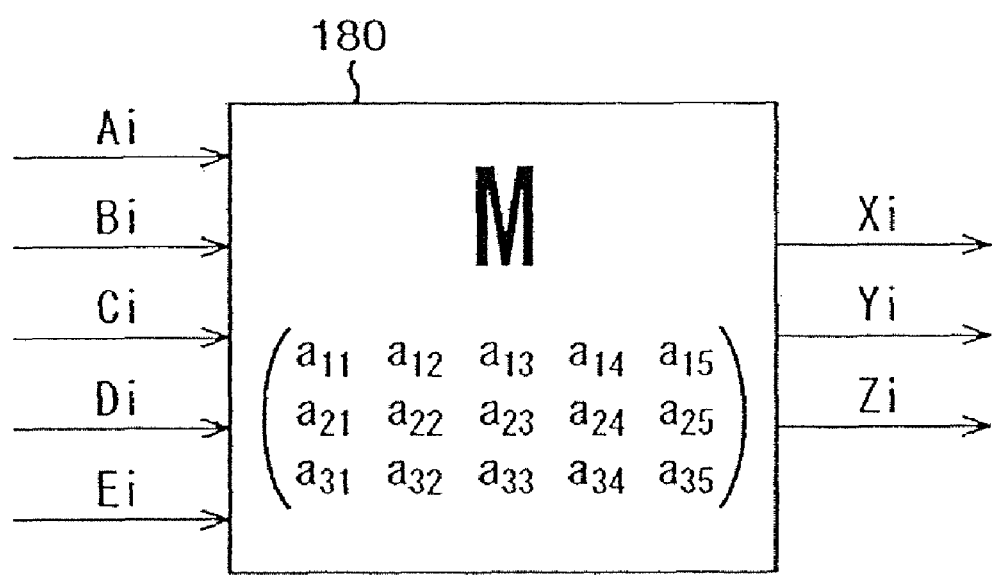
FIG. 18 is a block diagram depicting a color space compensation unit with five LEDs, with regard to the conventional image reading apparatus.
Figure 19:
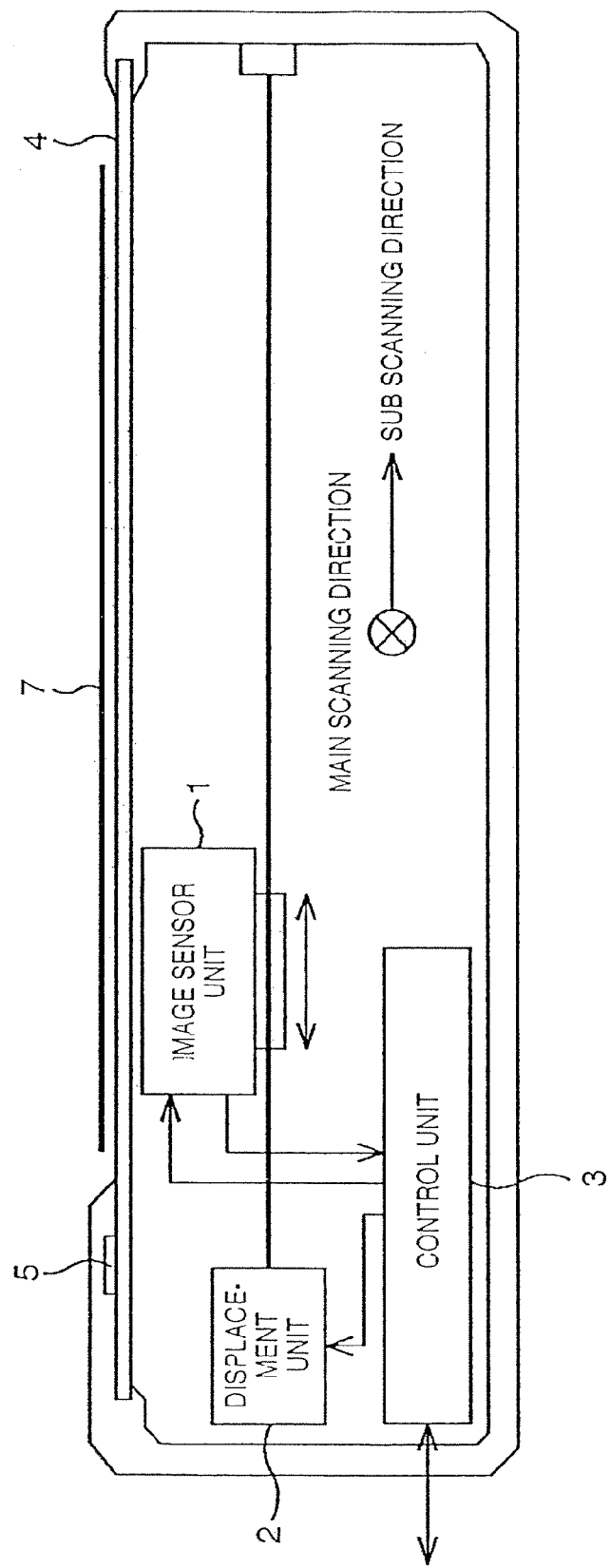
FIG. 19 depicts an exploded cross-sectional view that describes a sample assembly of the conventional image reading apparatus.

It is possible to use coefficients (a11, a12, . . . , a34, a35) of the 3×5 correction matrix M used in the color space conversion unit depicted in FIG. 18 when deriving the emission proportions of the five LEDs 11a through 11e in order to approximate the color-matching functions of the three types of light patterns. For example, it is possible to read the N color charts for which tristimulus values are known, and calculate the correction matrix M with a sensor signal for each of the color charts so read, by way of a light source switching operation performed five times, in which one of the five color LEDs 11a through 11e is turned in sequence.

Presuming that the target tristimulus value matrix of N colors is T, and the five-color sensor output matrix vis-à-vis the target of N colors is UN, the correction matrix M may be derived by the following equation 13, such that mean square error of TN and T'N, which equals MU, is minimized:

$$M[TNUNt][UNUNt]-1 \qquad \text{equation (13)}$$

In the present embodiment, the lighting condition register values TLXa through TLZe, of the respective LEDs 11a through 11e, that are configured in the lighting condition register 23a of the light source controller 23, as depicted in FIG. 4, are calculated with the following equations 14 through 28, in accordance with the correction matrix M coefficients a11, a12, . . . , a35, in FIG. 18, and the light cycles TLWa through TLWe vis-à-vis the white reference plate 5 for the respective LEDs 11a through 11e:

$$TLXa = TLWa \times a11 \qquad \text{equation (14)}$$

$$TLYa = TLWa \times a21 \qquad \text{equation (15)}$$

$$TLZa = TLWa \times a31 \qquad \text{equation (16)}$$

$$TLXb = TLWb \times a12 \qquad \text{equation (17)}$$

$$TLYb = TLWb \times a22 \qquad \text{equation (18)}$$

$$TLZb = TLWb \times a32 \qquad \text{equation (19)}$$

$$TLXc = TLWc \times a13 \qquad \text{equation (20)}$$

$$TLYc = TLWc \times a23 \qquad \text{equation (21)}$$

$$TLZc = TLWc \times a33 \qquad \text{equation (22)}$$

$$TLXd = TLWd \times a14 \qquad \text{equation (23)}$$

$$TLYd = TLWd \times a24 \qquad \text{equation (24)}$$

$$TLZd = TLWd \times a34 \qquad \text{equation (25)}$$

$$TLXe = TLWe \times a15 \qquad \text{equation (26)}$$

$$TLYe = TLWe \times a25 \qquad \text{equation (27)}$$

$$TLZe = TLWe \times a35 \qquad \text{equation (28)}$$

In other words, in the prior art, color space conversion processing by way of the 3×5 correction matrix M was performed in a latter stage of a processing circuit of an image signal that was outputted from the sensor array 15. According to the first embodiment, however, light is generated at the light source that approximates each of the three types of color-matching functions by driving the multi-color light source, i.e., the LEDs 11a through 11e. In such fashion, it is thus possible to process in a manner similar to the use of the conventional RGB three-color light source, even with regard to a scanner or other signal processing circuit.

In other words, where the prior art is concerned, using a four-color emission elements as a light source, for example, required four read scan cycles, as the light source was turned on in sequence and irradiated the original 7. It would further be necessary to provide an excess line memory for shading correction or correction of the read position of the original 7. According to the first embodiment, however, an amount of the line memory 38 to save the data required for the correction, etc is possible to be equal to that of the conventional line memory for three-color.

According to the first embodiment, it is possible to use a read scan method similar to the three-color light source switching operation regardless of whether the five-color light source switching operation is being used. As a plurality of light sources, i.e., the LEDs 11a through 11e, are turned on simultaneously, the overall light intensity increases, allowing read speed to be accelerated over the conventional RGB three-color lighting method.

FIG. 5A through FIG. 5C depict an example of a property of illumination that may be obtained via the image reading apparatus 6 according to the first embodiment.

The figures depict an emission spectra 51a through 51c of the three types of light patterns that are formed by suitable mixing of the lights from the five LEDs 11a through 11e, and a curve 52a through 52c of the CIE color-matching function $x(\lambda)$, $y(\lambda)$, and $z(\lambda)$. As depicted in the figures, it is apparent that the curve of the color-matching function 52a through 52c is closely approximated, albeit discretely, by the emission spectra 51a through 51c.

Thus, the respective LEDs 11a through 11e perform a lighting operation such that an intensity may be obtained that corresponds to the relative intensity of the color-matching function, according to the first embodiment. Doing so enhances color information from the image sensor unit 10 and significantly improves color reproducibility versus turning on only one LED at a time for each individual color, as in the prior art.

Figure 10:
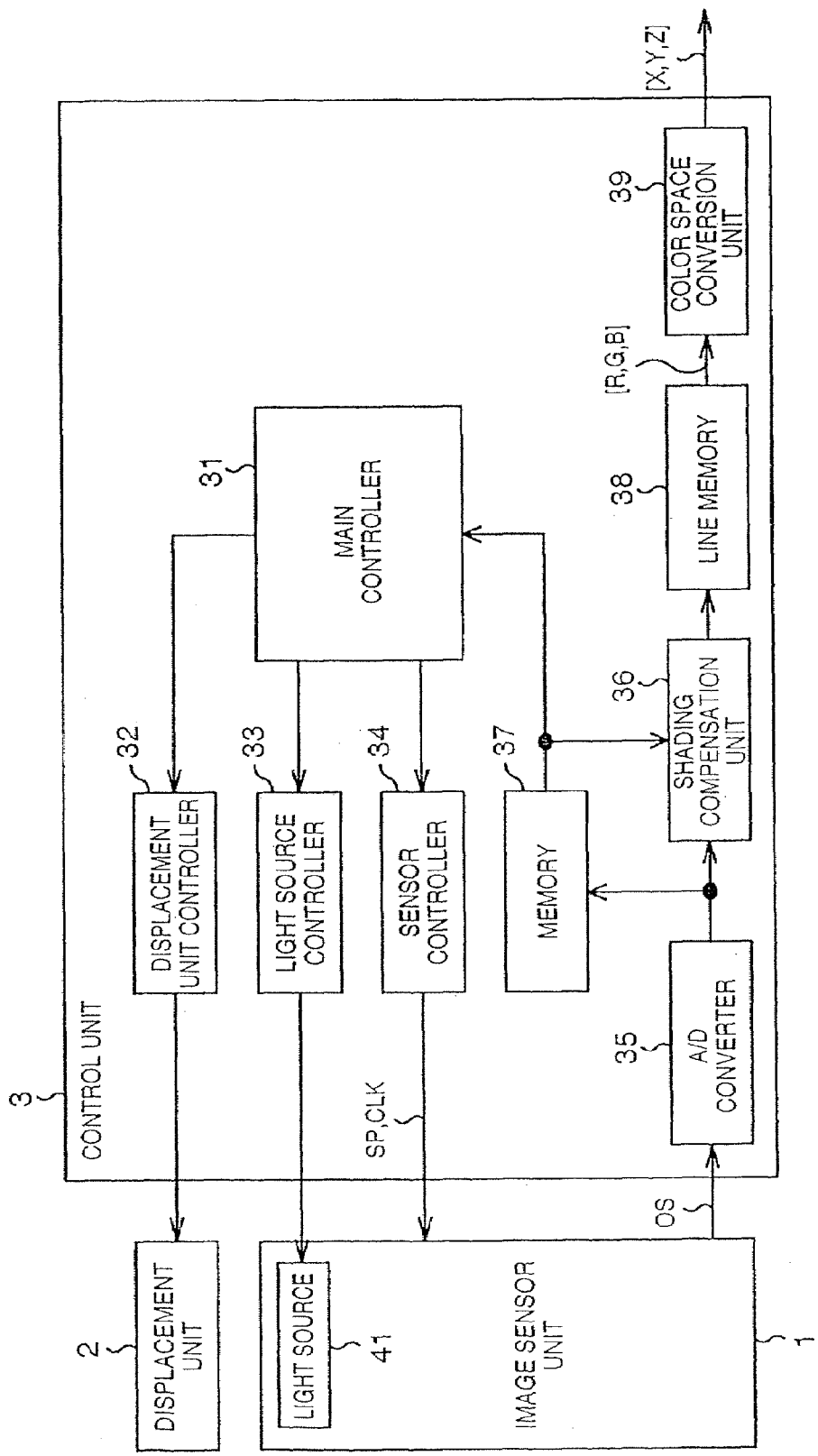
FIG. 10. is a block diagram depicting a conventional image reading apparatus assembly.
Figure 11:
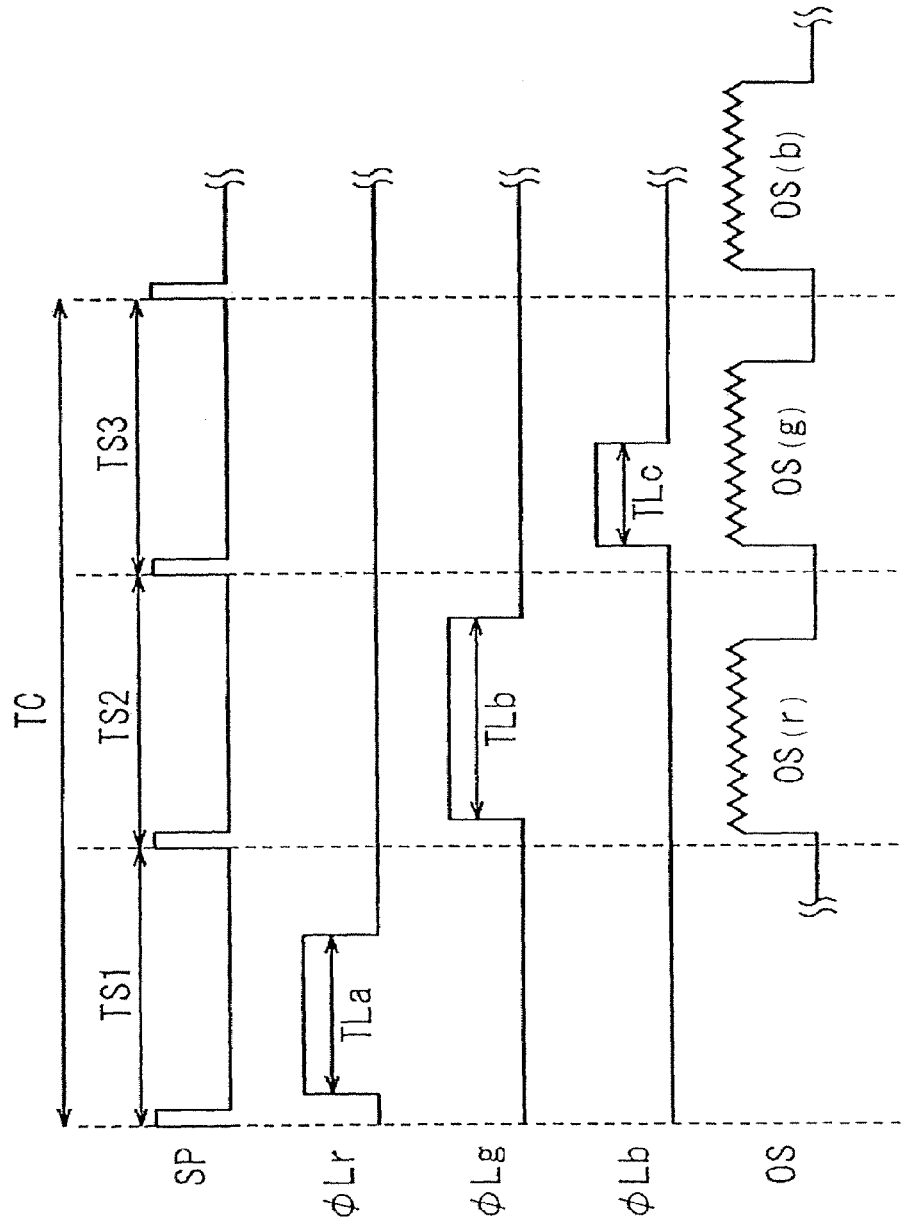
FIG. 11 is a timing chart that describes an image sensor unit driving operation with three LEDs, with regard to the conventional image reading apparatus.
Figure 12:
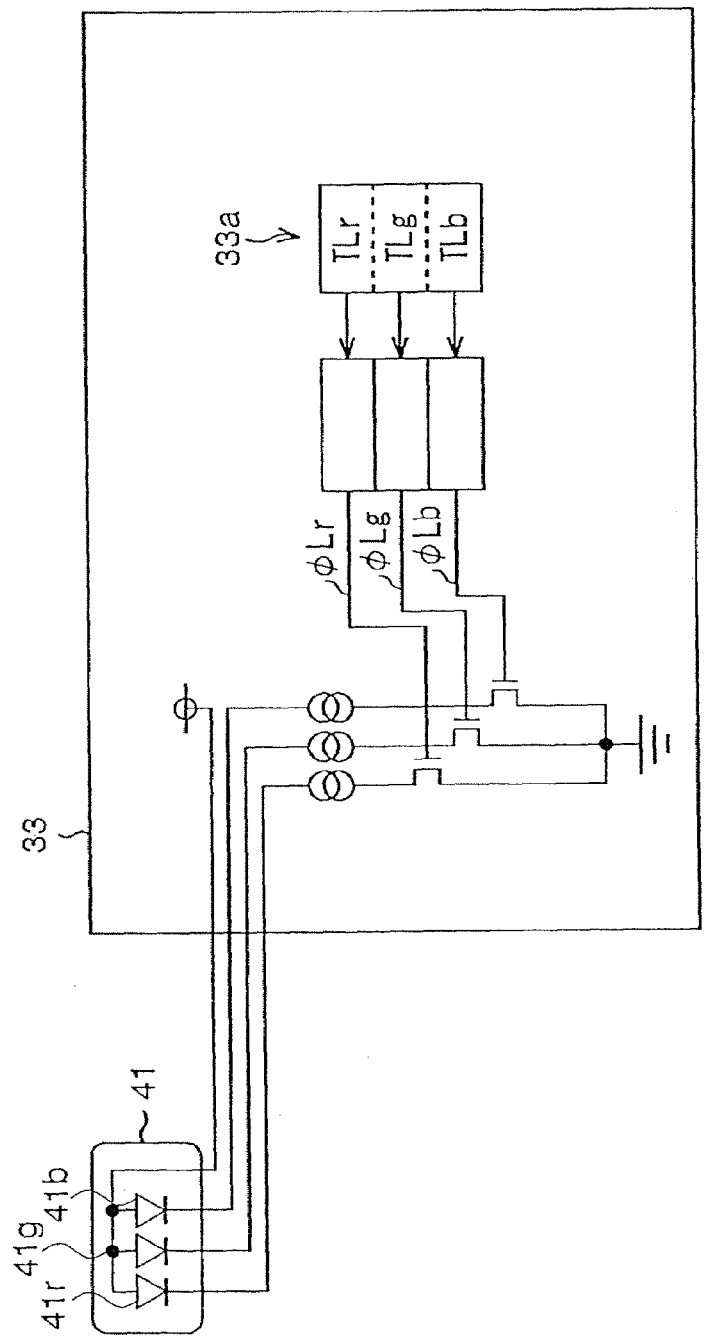
FIG. 12 depicts a light source controller assembly with three LEDs, with regard to the conventional image reading apparatus.
Figure 13:
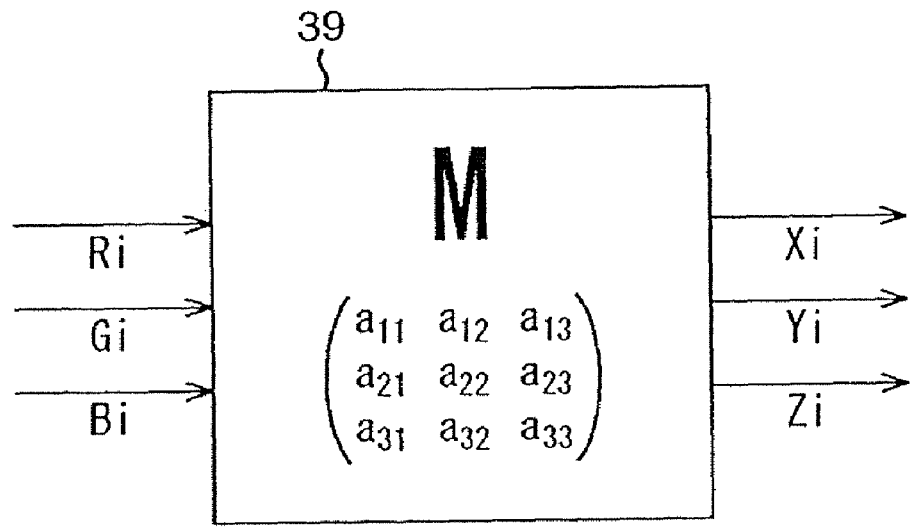
FIG. 13 is a block diagram depicting a color space compensation unit with three LEDs, with regard to the conventional image reading apparatus.
Figure 14:
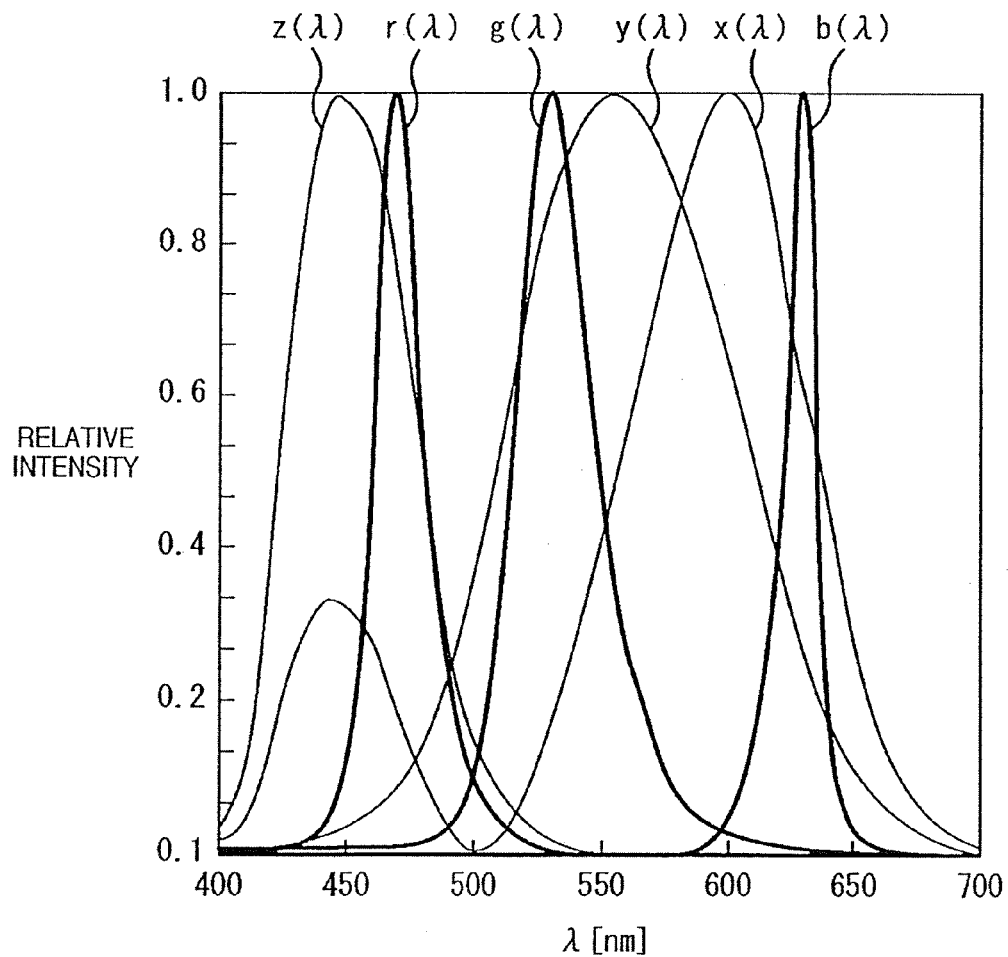
FIG. 14 depicts a view explaining a color-matching function and its relation to LED emission spectra, with regard to the conventional image reading apparatus.
Figure 15:
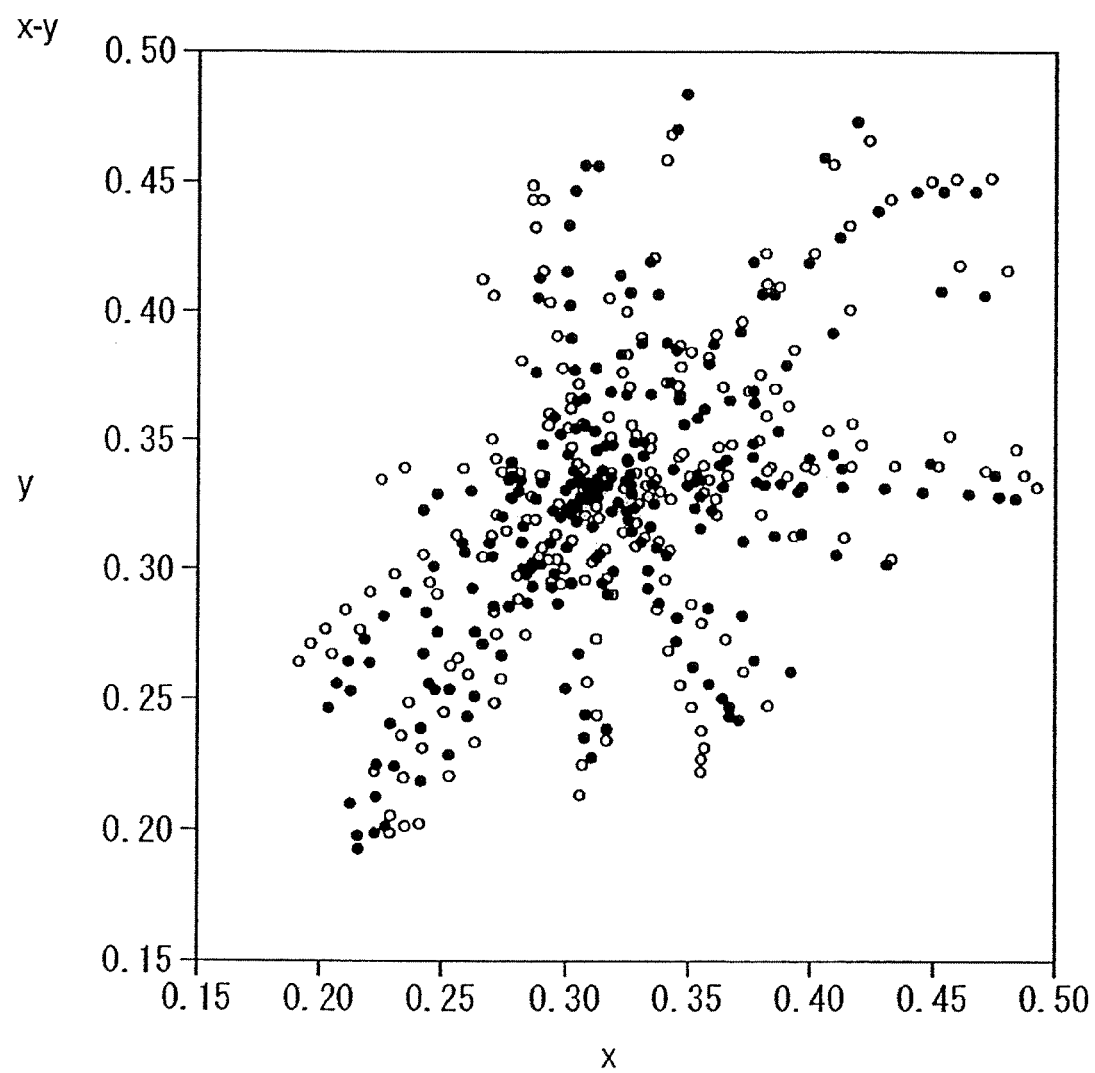
FIG. 15 depicts an x-y chromaticity diagram illustrating calorimetric error obtained by simulating a conventional image reading apparatus with five LEDs, with regard to the conventional image reading apparatus.
Figure 16:
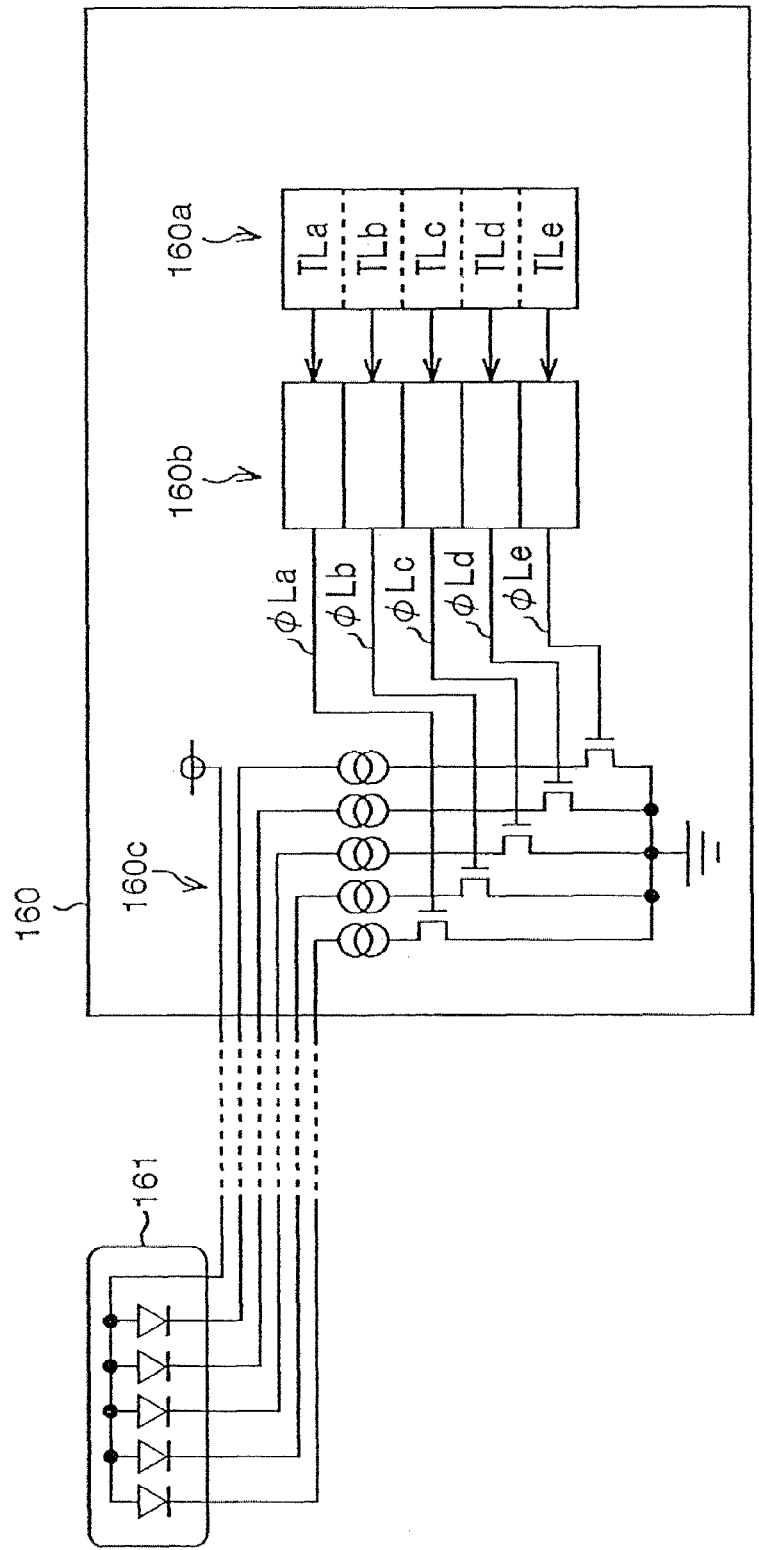
FIG. 16 depicts a light source controller assembly with five LEDs, with regard to the conventional image reading apparatus.
Figure 17:
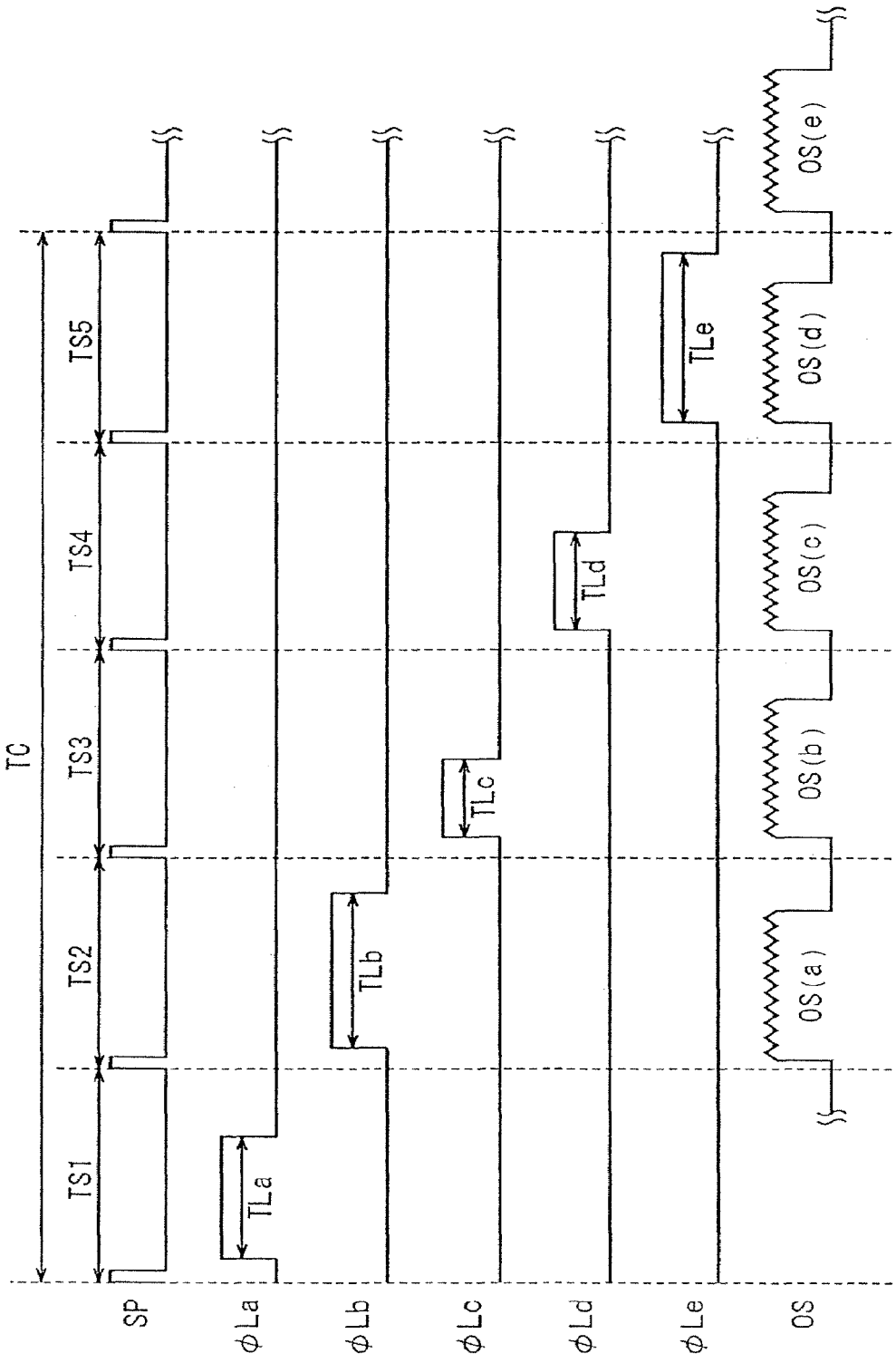
FIG. 17 is a timing chart that describes an image sensor unit driving operation with five LEDs, with regard to the conventional image reading apparatus.

According to the first embodiment, an emission color is used that approximates the color-matching function, and thus, the color space converter 39 (FIG. 10) is not required, as compared with the conventional image reading apparatus as shown in FIG. 10. Consequently, it is possible to directly read the modulated color information, without having to use color space conversion processing to convert the output signal from the image sensor to the tristimulus values. It is further permissible for the light emission timing of each of the LEDs 11a through 11e to overlap, and thus, it is also permissible for the image information accumulation cycle to be configured either to be equivalent to the maximum emission time of the LEDs 11a through 11e, or to be configured somewhat longer than the maximum emission time of the LEDs 11a through 11e. Accordingly, it is possible to reduce time to read one line's worth of image information, as compared with the conventional image reading apparatus as depicted in FIG. 10.

According to the first embodiment, the emission spectra 51a through 51c, which are formed by changing the emission proportion of each of the five LEDs 11a through 11e, in accordance with the lighting conditions set in the lighting condition register 23a, are made to approximate the three types of color-matching function represented by CIEXYZ or other standard color space, for example, the CIE color-matching functions 52a through 52c. In other words, the emission spectra 51a through 51c, which approximate the three types of color-matching function, are generated with the light source in the image signal integration cycles, or accumulation cycles, TS1, TS2, and TS3. It is thus possible to improve calorimetric precision, while suppressing a decline in a reading speed of (one line's worth of) information, and an increase in memory consumption, in the main scanning direction.

In the prior art, which lights only one LED at a time for each color in an image signal accumulation cycle, requires an image signal accumulation cycle for each LED that is turned on. Consequently, bringing the LED emission spectra closer to the color-matching function and increasing hue requires increasing the number of LEDs, as well as increasing the number of image signal accumulation cycles in response to the increased number of LEDs. For example, if five LEDs are used, five accumulation cycles will be required. Accordingly, increasing calorimetric precision in the prior art requires increasing data read speed or memory capacity for storing image data in the main scanning direction.

According to the first embodiment, on the other hand, the emission spectra 51a through 51c that approximate the three types of color-matching function are generated by presuming the image signal accumulation cycle TS1 through TS3 for the five LEDs 11a through 11e, and controlling the lighting independently for each of the LEDs 11a through 11e in the three accumulation cycles TS1 through TS3. Doing so allow improving the calorimetric precision, while also avoiding increased information read time or increase of memory capacity for storing image data in the main scanning direction.

According to the first embodiment, both the light quantity (intensity), and the emission cycle, of the LEDs 11a through 11e were made to vary for each of the three types of lighting patterns as pertain to the image signal integration cycle (accumulation cycle), TS1, TS2, and TS3, although doing so is not absolutely necessary. That is to say, if an emission spectra that is formed using the LEDs 11a through 11e, for example, the emission spectra 51a through 51c, is made to approximate three types of color-matching function, for example, the CIE color-matching functions 52a through 52c, then it would be sufficient to vary only anyone of the light intensity and the emission cycle of the LEDs 11a through 11e for each of the three types of lighting patterns.

According to the first embodiment, while the image signal was made to integrate, or accumulate, over the three integration cycles (accumulation cycles), TS1, TS2, and TS3, or in other words, that it was made to perform three reads over the main scanning direction, the number of accumulation cycles is not limited to three. That is to say, if the emission spectra that is formed using the LEDs 11a through 11e is made to approximate the three types of color-matching function, then the number of image signal accumulation cycles may be three or more, up to less than the number of LEDs, even if four or more LED light sources are being used. In particular, according to the embodiment, five LEDs 11a through 11e are in use, and thus, the number of image signal accumulation cycles may be four, rather than three.

As a further variant, there is a method of causing light to emit from LEDs of three colors with differing conditions within a single accumulation cycle, even when using the conventional RGB three LEDs, with, for example, a light intensity ratio that approximates an color-matching function $x(\lambda)$ as depicted in FIG. 5A. In the present instance, however, the number of accumulation cycles remains at the conventional three. Given, however, that it is possible to directly read out color information equivalent to the CIE color-matching function $x(\lambda)$, $y(\lambda)$, and $z(\lambda)$, according to the image reading apparatus 6 of the first embodiment, color space conversion is made unnecessary, allowing simplification of image information processing. In addition, lighting a plurality of emission elements in a single accumulation cycle allows a reduction in the light intensity of each individual emission element, which, in turn, allows a reduction in load on a drive power supply of an LED.

Furthermore, it is permissible for the three types of color-matching function to be any sort of function, if the emission spectrum that are formed using the LEDs 11a through 11e are made to approximate the three types of color-matching function. For example, it would be permissible to use the CIE color-matching function, or the three types of spectral curve, i.e., color-matching function, of a CIE standard observer.

Conceptually, having the emission spectra, for example, emission spectra 51a through 51c, that are formed of an emission operation of the LEDs 11a through 11e approximate three types of color-matching curve, for example, curves 52a through 52c of the CIE color-matching function $x(\lambda)$, $y(\lambda)$, and $z(\lambda)$, includes controlling the emission operation of the LEDs 11a through 11e.

MODIFIED EXAMPLE

It is possible, as another method of deriving the emission proportion of the five LEDs 11a through 11e, to employ the simplified method depicted below, in a case that the respective emission spectra of each of the LEDs 11a through 11e is known.

For example, if the dominant emission wavelength of the five LEDs 11a through 11e are presumed to be $\alpha$, $\beta$, $\gamma$, $\delta$, and $\epsilon$, respectively, all in nm, then the mixed proportion of the LEDs 11a through 11e that is equivalent to the color-matching function $x(\lambda)$ is configured to be $x(\alpha):x(\beta):x(\gamma):x(\delta):x(\epsilon)$, the mixed proportion of the LEDs 11a through 11e that is equivalent to the color-matching function $y(\lambda)$ is configured to be $y(\alpha):y(\beta):y(\gamma):y(\delta):y(\epsilon)$, and the mixed proportion of the LEDs 11a through 11e that is equivalent to the color-matching function $z(\lambda)$ is configured to be $z(\alpha):z(\beta):z(\gamma):z(\delta):z(\epsilon)$. Consequently, it is possible to make a rough approximation of the color-matching functions $x(\lambda)$, $y(\lambda)$, and $z(\lambda)$, by taking a composite of the emission spectra of the five LEDs 11a through 11e.

The information is stored in the lighting condition register 23a, as depicted in FIG. 4, and the drive signals $\phi$La through $\phi$Le, which are lighting and turning off each of the respective color LEDs 11a through 11e, are supplied from the pulse generation unit 23b to the lighting circuit 23c. Consequently, it is possible to obtain three types of lighting, in response to the color-matching functions $x(\lambda)$, $y(\lambda)$, and $z(\lambda)$. The lighting circuit 23c is constituted using a prescribed power supply for lighting the respective LEDs 11a through 11e, and a switching circuit, i.e., a transistor, that operates in synchronization with the pulse generation unit 23b, and lights the LEDs 11a through 11e during the cycles when the drive signals $\phi$La through $\phi$Le are on.

Typically, spectral reflectivity property of a dye or a pigment that is used with the original 7 is a comparatively broad spectral curve with respect to the wavelength axis, with a small quantity of change vis-à-vis the wavelength, and is capable of obtaining calorimetric performance that, albeit a discrete approximation, is adequate for enough practical purposes.

FIG. 6 depicts an x-y chromaticity diagram that displays calorimetric precision obtained by simulating an image reading apparatus according to the first embodiment.

The white dots in FIG. 6 denote the IT8 target XYZ tristimulus values, and the black dots denote the tristimulus values that are the output of the image sensor unit 10 of the image reading apparatus according to the first embodiment. A comparison of the x-y chromaticity diagram depicted in FIG. 6 with the x-y chromaticity diagram depicted in FIG. 15 makes apparent the fact that error is reduced in either color systems in FIG. 6. The mean color difference $\Delta E$ that is obtained from the x-y chromaticity diagram depicted in FIG. 6 is lowered to approximately two, such that the color difference cannot be discerned with the naked eye.

The wavelength property of the spectral reflectivity of a dye or a pigment that is used with the original 7 changes but little, and thus, is capable of obtaining calorimetric performance that is adequate for enough practical purposes, for five to six colors. In the embodiment, therefore, a case in which five emission elements are provided is described. An effect of the first embodiment, however, is that the more colors of LEDs that constitute the light source, the better, and it is possible to determine at will how many colors of LEDs, i.e., emission elements, to use. That is to say, the more colors, the greater the improvement in calorimetric precision, and system resources, which may include, but are not limited to, reading speed or memory, do not increase compared with the conventional method of switching the light source as many times as there are colors, even if the number of colors is increased.

Second Embodiment

Following is a description of a second embodiment, which differs from the first embodiment only in the timing by which the LEDs 11a through 11e are turned on. Accordingly, the description of the second embodiment will use symbols identical to the symbols given in FIGS. 1 through 6, and FIGS. 8 through 19, and omit detailed description, for the components that are identical to components in the conventional image reading apparatus, as well as the image reading apparatus 6 according to the first embodiment.

Given that the sensor array 15 that constitutes the image sensor unit 10 integrates and outputs an optical carrier signal throughout one cycle, it is permissible for the photoelectric conversion function of the sensor array 15 to be performed in any of the respective image signal accumulation cycles TS1, TS2, or TS3. It would be permissible, for example, to turn on the light source 11 in a time-shared manner.

FIG. 7 is a timing chart explaining an example of a driving operation of the image sensor unit 10 when time-sharing the lighting of the light source 11, according to the second embodiment.

As depicted in FIG. 7, a distinguishing feature of the second embodiment is that the timing by which the respective LEDs 11a through 11e are turned on is prevented from overlapping within the respective image signal accumulation cycles TS1, TS2, and TS3. An advantage of the present method is that a power surge to the respective LEDs 11a through 11e is minimized, and load on the power supply is reduced, by the driving current that is supplied to the respective LEDs 11a through 11e being dispersed.

Given that the timing by which each of the LEDs 11a through 11e is turned on is a time sequence, it is possible to turn on a next one of the LEDs 11a through 11e in synchronization with the timing by which one of the LEDs 11a through 11e for one color is switched off, allowing a simplified control circuit assembly. Given, however, that the present method results in a different lighting timing for each color of the LEDs 11a through 11e, each of the accumulation cycles TS1, TS2, and TS3 is longer than that of the first embodiment. Another inherent weakness with the present method is that the image signal accumulation cycle TC for a single scan cycle may become longer than that of the first embodiment.

Other Embodiments of the Present Invention

Included within the scope of the present invention is that which is implemented by supplying software program code to a computer that is within either an apparatus that is connected the respective devices, or that is within the system thereof, in order to operate the respective devices that fulfill the functions of the embodiment, and that operate the respective devices in accordance with a program that is loaded into the computer, either CPU or MPU, that is within either the system or the device.

In the present circumstance, the software program code itself will fulfill the functions of the embodiment, and the program code itself, and a unit adapted to supplying the program code to computer, for example, a recording medium upon which the program code is stored, will constitute the present invention. Examples of a recording medium upon which the program code is stored may include, but are not limited to, a floppy disk, a hard drive, an optical disk, a magneto-optical disk, a CD-ROM, a magnetic tape, a non-volatile memory card, or ROM.

That the program code is included in the present invention when the functions according to the embodiment are fulfilled by the program code in conjunction with an operating system (OS), another application program, or other program code that is running on the computer on which the program code is installed, in addition to when the functions according to the embodiment are fulfilled by the program code that is supplied by the computer being executed, is presumed herein as written.

That when a CPU or other device that is installed in a computer expansion board or an expansion unit that is connected to the computer performs actual processing, in whole or in part, in accordance with the direction of the program code once it is loaded into memory that is installed in the computer expansion board or the expansion unit that is connected to the computer, and the functions according to the embodiment are fulfilled by the processing, is also included in the present invention, is presumed herein as written.

INDUSTRIAL APPLICABILITY

It is possible to use an image processing apparatus of the present invention in applied reading of an original, as well as a scanner or a color fax, or a copying machine, or as a multi-function peripheral thereof, for example. It may also be used as an image input unit of a color copying machine.

As many apparently widely different embodiments of, and alterations and corrections to, the present invention may be made without departing from the spirit and scope thereof, it is to be understood that the invention is not limited to the specific embodiments thereof, except as defined in the appended claims.

CLAIM OF PRIORITY

The application claims priority from Japanese Patent Application No. 2004-221259, filed Jul. 29, 2004, and Japanese Patent Application No. 2005-167464, filed Jun. 7, 2005, which are hereby incorporated by reference herein in their entirety.

The invention claimed is:

1. An image reading apparatus, comprising:
not less than four light emission elements, each with an emission spectrum different from the others;
an emission control unit adapted to controlling, at least one of emission cycle and emission intensity of the not less than four light emission elements, and causing the light emission elements, either whole or in part, to emit light, either for an identical or a differing cycle, within an accumulation cycle;
a photoelectric conversion unit adapted to receiving light reflected from an original, which is obtained by emitting light from the not less than four light emission elements toward the original, according to the control of said emission control unit, and converting the reflected light into an electrical signal; and
a reading unit adapted to reading image information from the original, in accordance with the electrical signal that is converted by said photoelectric conversion unit,
wherein said photoelectric conversion unit receives light reflected from the original for each of a plurality of accumulation cycles in the main scanning direction; and
said emission control unit causes the not less than four light emission elements, either whole or in part, to emit light, for each of the plurality of accumulation cycles in the main scanning direction, and causes a relative light emission quantity proportion of light emitted in at least one accumulation cycle to be approximated to one curve of three types of color-matching functions, wherein the number of accumulation cycles in the main scanning direction is not less than three, and less than the number of light emission elements.

2. The image reading apparatus according to claim 1, wherein said emission control unit drives emission of the not less than four light emission elements, with different light emission timing, either whole or in part, in each of the plurality of accumulation cycles.

3. The image reading apparatus according to claim 1, wherein:
said photoelectric conversion unit further comprises a photoelectric conversion sensor;
wherein the respective emission cycles of the light emission elements are determined in accordance with a maximum lighting time that is determined in accordance with a proportion of an intensity of light that is reflected from a white reference plate and a standard maximum reflected light intensity, as detected by the photoelectric conversion sensor vis-à-vis a prescribed emission cycle, and a coefficient for approximating the color-matching function.

4. The image reading apparatus according to claim 1, wherein said emission control unit controls emission driving of, at a minimum, either one of emission cycle or emission intensity of the respective light emission elements, such that a proportion of a relative quantity of light that said emission control unit causes to emit from the light emission elements within a minimum of one accumulation cycle approximates to three types of spectral curve of a CIE color-matching function.

5. The image reading apparatus according to claim 1, wherein said emission control unit further comprises:
   a memory that stores a light emission condition for each of the respective not less than four light emission elements; and
   a lighting circuit that drives light emission for each of the respective not less than four light emission elements, in accordance with the light emission condition that is stored in the memory.

6. The image reading apparatus according to claim 1, further comprising:
   a movement unit adapted to altering the relative position of the light emission element and the original.

7. An image reading apparatus for receiving light that is reflected off an original, which is illuminated by not less than four light emission elements, each with an emission spectrum different from the others, and generating an image signal, comprising:
   an emission control unit adapted to controlling, at least one of emission cycle and emission intensity of the not less than four light emission elements, either whole or in part, and driving light emission with a differing condition for each of a plurality of accumulation cycles that run in series in the main scanning direction;
   a photoelectric conversion unit adapted to receiving light reflected from the original, which is obtained by emitting light from the not less than four light emission elements toward the original, according to the control of said emission control unit, and converting the reflected light into an electrical signal; and
   a reading unit adapted to reading image information from the original, in accordance with the electrical signal that is converted by said photoelectric conversion unit,
   wherein said photoelectric conversion unit receives light reflected from the original for each of a plurality of accumulation cycles in the main scanning direction;
   said emission control unit causes the not less than four light emission elements, either whole or in part, to emit light, with the differing condition for each of the plurality of accumulation cycles in the main scanning direction, and causes a relative light emission quantity proportion of light emitted in at least one accumulation cycle to be approximated to one curve of three types of color-matching functions, wherein the number of accumulation cycles in the main scanning direction is not less than three, and less than the number of light emission elements.

8. An image reading apparatus control method for receiving light that is reflected off an original, which is illuminated by not less than four light emission elements, each with an emission spectrum different from the others, and generating an image signal, comprising:
   an emission control step of controlling, at least one of emission cycle and emission intensity of the not less than four light emission elements, and causing the light emission elements, either whole or in part, to emit light, either for an identical or a differing cycle, within an accumulation cycle;
   a photoelectric conversion step of receiving light reflected from the original, which is obtained by emitting light from the not less than four light emission elements toward the original, according to the control in said emission control step, and converting the reflected light in an electrical signal; and
   a reading step of reading image information from the original, in accordance with the electrical signal that is converted in said photoelectric conversion step,
   wherein said photoelectric conversion step receives light reflected from the original for each of a plurality of accumulation cycles in the main scanning direction, and
   said emission control step causing the not less than four light emission elements, either whole or in part, to emit light, with a differing condition for each of the plurality of accumulation cycles in the main scanning direction, and causes a relative light emission quantity proportion of light emitted in at least one accumulation cycle to be approximated to one curve of three types of color-matching functions, wherein the number of accumulation cycles in the main scanning direction is not less than three, and less than the number of light emission elements.

\* \* \* \* \*